US010636557B2

(12) United States Patent
Kakiuchi et al.

(10) Patent No.: US 10,636,557 B2
(45) Date of Patent: Apr. 28, 2020

(54) ELECTRONIC COMPONENT

(71) Applicant: Taiyo Yuden Co., Ltd., Tokyo (JP)

(72) Inventors: Ikuo Kakiuchi, Wakayama (JP);
Masataka Kohara, Wakayama (JP);
Ichiro Yokoyama, Wakayama (JP);
Keiichi Nozawa, Wakayama (JP);
Masakazu Okazaki, Wakayama (JP);
Yoshikazu Maruyama, Wakayama
(JP); Masuo Yatabe, Tokyo (JP)

(73) Assignee: TAIYO YUDEN CO., LTD., Tokyo
(JP)

( * ) Notice: Subject to any disclaimer, the term of this
patent is extended or adjusted under 35
U.S.C. 154(b) by 227 days.

(21) Appl. No.: 15/459,543

(22) Filed: Mar. 15, 2017

(65) Prior Publication Data
US 2017/0352467 A1    Dec. 7, 2017

(30) Foreign Application Priority Data

Jun. 1, 2016   (JP) .................................. 2016-110478

(51) Int. Cl.
*H01F 27/29*   (2006.01)
*H01F 27/245*   (2006.01)
*H01F 17/00*   (2006.01)
*H01G 2/10*   (2006.01)
*H01F 27/28*   (2006.01)
(Continued)

(52) U.S. Cl.
CPC ....... *H01F 27/245* (2013.01); *H01F 17/0013*
(2013.01); *H01F 27/2804* (2013.01); *H01F
27/29* (2013.01); *H01G 2/10* (2013.01); *H01G
4/005* (2013.01); *H01G 4/06* (2013.01); *H01G
4/228* (2013.01)

(58) Field of Classification Search
CPC ............................ H01F 5/00; H01F 27/00–36
USPC ............ 336/65, 83, 200, 206–208, 232–234
See application file for complete search history.

(56) References Cited

U.S. PATENT DOCUMENTS

2016/0049243 A1    2/2016   Uno et al.

FOREIGN PATENT DOCUMENTS

JP    11-204367 A    7/1999
JP    2006-324461 A    11/2006
(Continued)

OTHER PUBLICATIONS

Office Action Korean Patent Application No. 10-2017-0030017
dated Mar. 21, 2018 with English translation.
(Continued)

*Primary Examiner* — Tuyen T Nguyen
(74) *Attorney, Agent, or Firm* — Pillsbury Winthrop Shaw
Pittman, LLP

(57)   ABSTRACT

One object of the present invention is to enable identification
of the direction of an electronic component, while suppressing
increase in cost. The present invention provides an
electronic component comprising: an insulator portion having
a plurality of surfaces (e.g., a top surface, a bottom
surface, end surfaces, and side surfaces), the insulator portion
including a plurality of regions having different transmissivities
of a light beam entering one of the plurality of
surfaces (e.g., a top surface, a bottom surface, end surfaces,
and side surfaces); an internal conductor portion provided in
the insulator portion; and external electrodes provided on the
insulator portion and electrically connected to the internal
conductor portion.

24 Claims, 26 Drawing Sheets

(51) Int. Cl.
    *H01G 4/005* (2006.01)
    *H01G 4/06* (2006.01)
    *H01G 4/228* (2006.01)

(56) References Cited

FOREIGN PATENT DOCUMENTS

| | | | |
|---|---|---|---|
| JP | 2007141987 A | * | 6/2007 |
| JP | 2008-159858 | | 7/2008 |
| JP | 2008-159858 A | | 7/2008 |
| JP | 2011-029278 | | 2/2011 |
| JP | 2015-19083 A | | 1/2015 |

OTHER PUBLICATIONS

Non-final Office Action dated Mar. 4, 2019 issued in corresponding Taiwanese Patent Application No. 106110095 with English translation.

* cited by examiner

| Transmissivity of Material 1 [%] | 0 | 0 | 0 | 0 | 0 | 0 |
|---|---|---|---|---|---|---|
| Transmissivity of Material 2 [%] | 5 | 8 | 10 | 12 | 15 | 20 |
| Difference in Transmissivity [%] | 5 | 8 | 10 | 12 | 15 | 20 |
| Identification by Camera | × | × | ○ | ○ | ○ | ○ |
| Error Rate | 1000/1000 | 788/1000 | 0/1000 | 0/1000 | 0/1000 | 0/1000 |

| Transmissivity of Material 1 [%] | 12 | 12 | 12 | 20 | 20 | 20 |
|---|---|---|---|---|---|---|
| Transmissivity of Material 2 [%] | 15 | 20 | 25 | 30 | 40 | 60 |
| Difference in Transmissivity [%] | 3 | 8 | 13 | 10 | 20 | 40 |
| Identification by Camera | × | × | ○ | ○ | ○ | ○ |
| Error Rate | 689/1000 | 156/1000 | 0/1000 | 0/1000 | 0/1000 | 0/1000 |

| Transmissivity of Material 1 [%] | 0 | 8 | 8 | 8 | 8 | 8 |
|---|---|---|---|---|---|---|
| Transmissivity of Material 2 [%] | 25 | 10 | 12 | 15 | 20 | 25 |
| Difference in Transmissivity [%] | 25 | 2 | 4 | 7 | 12 | 17 |
| Identification by Camera | ○ | × | × | × | ○ | ○ |
| Error Rate | 0/1000 | 1000/1000 | 1000/1000 | 639/1000 | 0/1000 | 0/1000 |

| Transmissivity of Material 1 [%] | 25 | 25 | 25 | 30 | 30 | 40 |
|---|---|---|---|---|---|---|
| Transmissivity of Material 2 [%] | 30 | 40 | 60 | 40 | 60 | 60 |
| Difference in Transmissivity [%] | 5 | 15 | 35 | 10 | 30 | 20 |
| Identification by Camera | × | ○ | ○ | ○ | ○ | ○ |
| Error Rate | 771/1000 | 0/1000 | 0/1000 | 0/1000 | 0/1000 | 0/1000 |

○ : Successful    × : Unsuccessful

Fig. 5b

ELECTRONIC COMPONENT

CROSS-REFERENCE TO RELATED APPLICATIONS

This application is based on and claims the benefit of priority from Japanese Patent Application Serial No. 2016-110478 (filed on Jun. 1, 2016), the contents of which are hereby incorporated by reference in their entirety.

TECHNICAL FIELD

The present invention relates to an electronic component.

BACKGROUND

There have been known methods of identifying the direction of an electronic component. In one example of such methods, a marker is provided on an electronic component to identify the direction thereof (e.g., Japanese Patent Application Publication No. 2008-159858 (hereinafter "the '858 Publication")). In another example of such methods, an X ray is used to examine through an electronic component to identify the direction thereof (e.g., Japanese Patent Application Publication No. 2011-29278 (hereinafter "the '278 Publication")).

When a marker is used to identify the direction of an electronic component as in the '858 Publication, the cost is increased because of the need of the step of forming the marker. When an X ray is used to identify the direction of an electronic component as in the '278 Publication, the cost is increased because of the need of an apparatus for emitting the X ray and a protection for blocking the X ray.

SUMMARY

The present invention addresses the above problem, and one object of the present invention is to enable identification of the direction of an electronic component, while suppressing increase in cost.

The present invention provides an electronic component comprising: an insulator portion having a plurality of surfaces, the insulator portion including a plurality of regions having different transmissivities of a light beam entering one of the plurality of surfaces; an internal conductor portion provided in the insulator portion; and a plurality of external electrodes provided on the insulator portion and electrically connected to the internal conductor portion.

In the above arrangement, it may be possible that the insulator portion includes a first region and a second region having different transmissivities of the light beam entering the one of the plurality of surfaces, and the first region and the second region contain different materials having different transmissivities of the light beam for a same thickness.

In the above arrangement, it may be possible that the insulator portion includes a first region and a second region having different transmissivities of the light beam entering the one of the plurality of surfaces, and the first region and the second region include portions having a same transmissivity of the light beam for a same thickness and having different thicknesses.

In the above arrangement, it may be possible that one of the first and second regions having a higher transmissivity of the light beam is transparent to visible light and extends from the one of the plurality of surfaces of the insulator portion to the internal conductor portion.

In the above arrangement, it may be possible that one of the first and second regions includes a functional region including a functional portion of the internal conductor portion, and the other does not include the functional region and includes a surrounding region positioned around the functional region, and the functional region is offset from a middle of the insulator portion in a direction parallel with the one of the plurality of surfaces.

In the above arrangement, it may be possible that the difference in transmissivity of the light beam between the first region and the second region is equal to or greater than 10%.

In the above arrangement, it may be possible that the first and second regions are composed mainly of glass or resin and contain different amounts of metal oxide, organic coloring matter, silicon oxide, graphite, or carbonized silicon.

In the above arrangement, it may be possible that the first and second regions are composed mainly of glass or resin and contain different amounts of metal oxide, and the metal oxide includes at least one of aluminum oxide, cobalt oxide, manganese oxide, titanium oxide, potassium oxide, magnesium oxide, copper oxide, iron oxide, and zinc oxide.

In the above arrangement, it may be possible that the insulator portion includes a conductor-containing layer and a pair of non-conductor layers, the conductor-containing layer including the internal conductor portion, one of the pair of non-conductor layers being provided on the conductor-containing layer in a position closer to a bottom surface serving as a mounting surface, the other of the pair of non-conductor layers being provided on the conductor-containing layer in a position closer to a top surface opposed to the bottom surface, and the pair of non-conductor layers have different transmissivities of the light beam entering a surface crossing the bottom surface and the top surface.

In the above arrangement, it may be possible that the insulator portion includes a conductor-containing layer and a non-conductor layer, the conductor-containing layer including the internal conductor portion, the non-conductor layer being provided on the conductor-containing layer in a position closer to a bottom surface serving as a mounting surface or in a position closer to a top surface opposed to the bottom surface, and the conductor-containing layer and the non-conductor layer have different transmissivities of the light beam entering a surface crossing the bottom surface and the top surface.

In the above arrangement, it may be possible that the insulator portion includes a conductor-containing layer and at least one non-conductor layer, the conductor-containing layer including the internal conductor portion, the at least one non-conductor layer being provided on the conductor-containing layer in at least one of a position closer to a bottom surface serving as a mounting surface and a position closer to a top surface opposed to the bottom surface, and the conductor-containing layer has a higher transmissivity of the light beam than the at least one non-conductor layer, the light beam entering a surface crossing the bottom surface and the top surface, and the conductor-containing layer is transparent to visible light.

In the above arrangement, it may be possible that the insulator portion includes a conductor-containing layer and a pair of non-conductor layers, the conductor-containing layer including the internal conductor portion, one of the pair of non-conductor layers being provided on the conductor-containing layer in a position closer to a bottom surface serving as a mounting surface, the other of the pair of non-conductor layers being provided on the conductor-containing layer in a position close to a top surface opposed to the bottom surface, the conductor-containing layer and the pair of non-conductor layers have different transmissivities of the light beam entering a surface crossing the bottom surface and the top surface, and the conductor-containing layer is offset from a middle of the insulator portion toward the top surface or the bottom surface.

In the above arrangement, it may be possible that the pair of non-conductor layers have a larger specific gravity than the conductor-containing layer.

In the above arrangement, it may be possible that in a direction of long sides of the bottom surface of the insulator portion, the pair of non-conductor layers have a larger length than the conductor-containing layer.

In the above arrangement, it may be possible that the pair of non-conductor layers have a larger length in the top-bottom direction than the conductor-containing layer.

In the above arrangement, it may be possible that the insulator portion has a bottom surface serving as a mounting surface and a top surface opposed to the bottom surface, and a length of the bottom surface in a direction of short sides of the bottom surface is larger than a distance between the bottom surface and the top surface, and a functional portion of the internal conductor portion is positioned closer to the top surface of the insulator portion.

In the above arrangement, it may be possible that a connection portion between the internal conductor portion and the plurality of external electrodes are positioned closer to the top surface than is a portion of the functional portion closest to the bottom surface.

In the above arrangement, it may be possible that the plurality of external electrodes extend from the bottom surface of the insulator portion to end surfaces connected to short sides of the bottom surface of the insulator portion, a length of the plurality of external electrodes on the bottom surface of the insulator portion in a direction of long sides of the bottom surface is larger than a length of the plurality of external electrodes on the end surfaces of the insulator portion in a top-bottom direction, and a length of the plurality of external electrodes on the end surfaces of the insulator portion in the top-bottom direction is equal to or less than half a length of the electronic component in the top-bottom direction.

In the above arrangement, it may be possible that the plurality of external electrodes extend from the bottom surface of the insulator portion via end surfaces connected to short sides of the bottom surface of the insulator portion to the top surface of the insulator portion, and in a direction of long sides of the bottom surface of the insulator portion, a length of the plurality of external electrodes on the top surface of the insulator portion is smaller than a length of the plurality of external electrodes on the bottom surface of the insulator portion.

In the above arrangement, it may be possible that the insulator portion includes a region that transmits the light beam between a functional portion of the internal conductor portion and the plurality of external electrodes.

In the above arrangement, it may be possible that the electronic component is a coil element.

In the above arrangement, it may be possible that the electronic component is a capacitor element.

The present invention enables identification of the direction of an electronic component, while suppressing increase in cost.

BRIEF DESCRIPTION OF THE DRAWINGS

FIGS. 5a and 5b illustrate an experiment of identifying films.

DESCRIPTION OF EXAMPLE EMBODIMENTS

Embodiments of the present invention will now be described with reference to the attached drawings.

Embodiment 1

Figure 1:
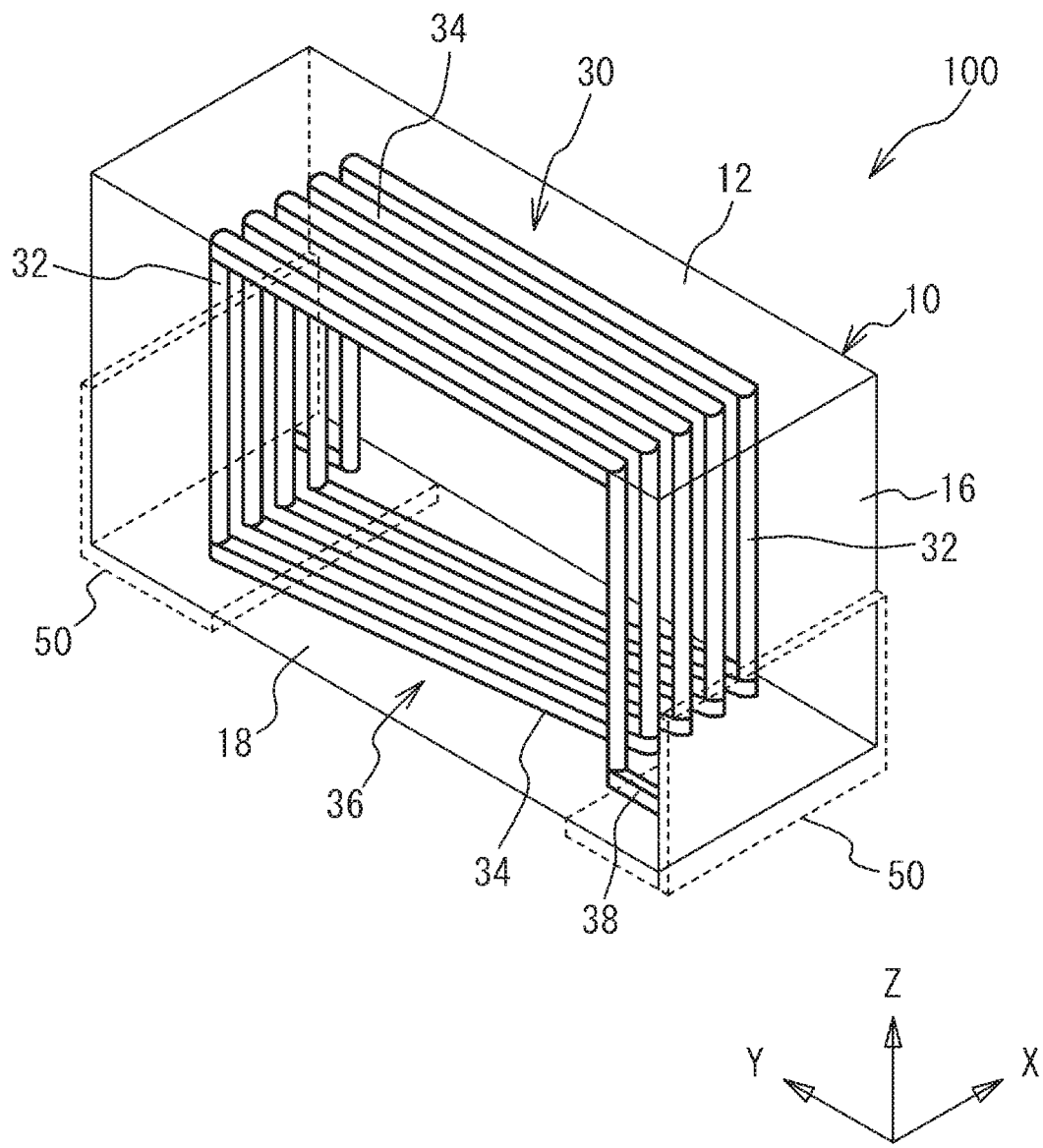
FIG. 1 is a perspective view of an electronic component according to Embodiment 1.
Figure 2A:
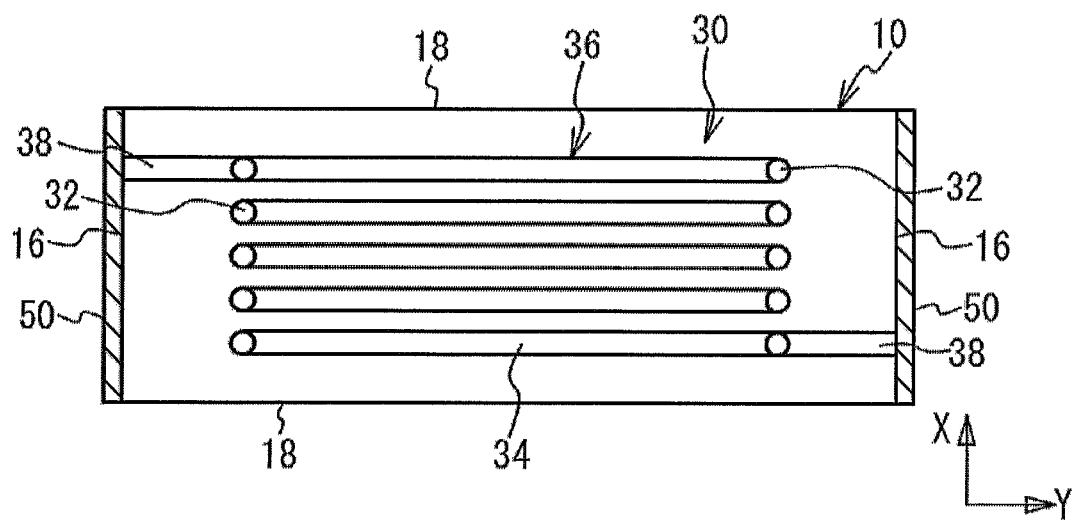
FIG. 2a is a top sectional view of the electronic component according to Embodiment 1.
Figure 2B:
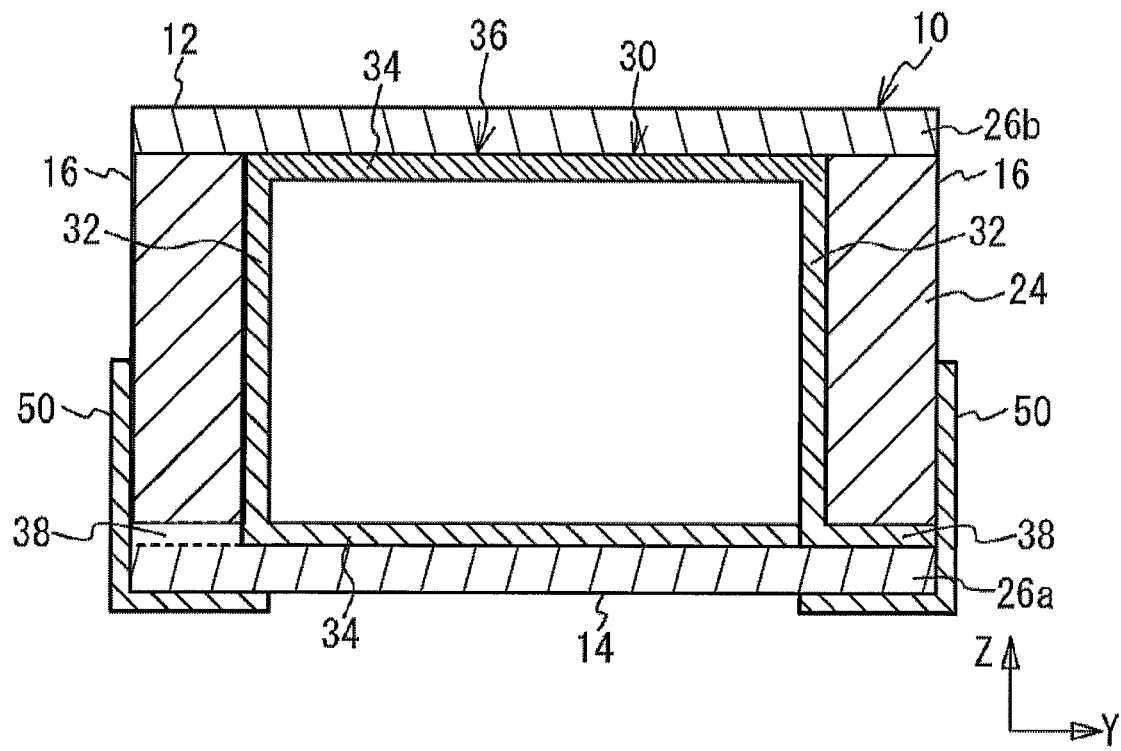
FIG. 2b is a side sectional view of the electronic component according to Embodiment 1.
Figure 2C:
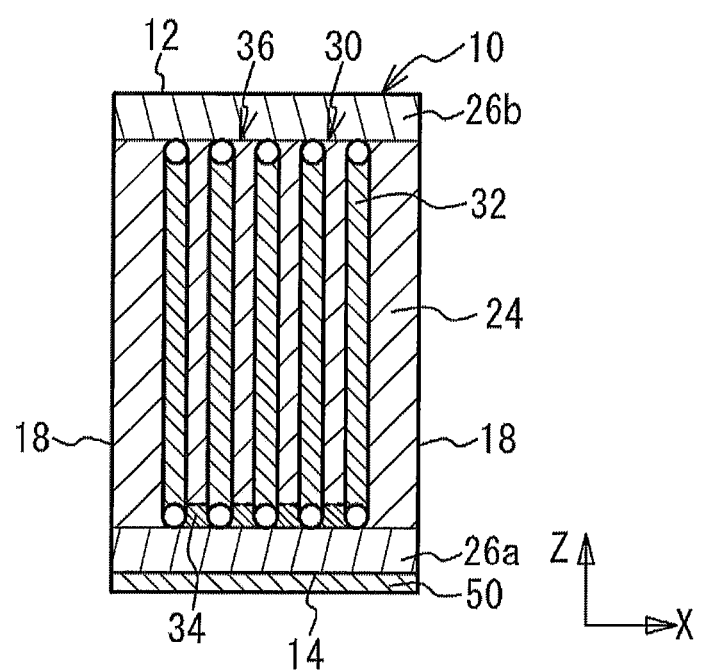
FIG. 2c is an end sectional view of the electronic component according to Embodiment 1.

The electronic component of Embodiment 1 may be a coil element, for example. FIG. 1 is a perspective view of the electronic component according to Embodiment 1. FIG. 2a is a top sectional view of the electronic component 100 according to Embodiment 1, FIG. 2b is a side sectional view of the same, and FIG. 2c is an end sectional view of the same. As shown in FIGS. 1, 2a, and 2b, the electronic component 100 may include an insulator portion 10, an internal conductor portion 30, and external electrodes 50.

The insulator portion 10 may have a top surface 12, a bottom surface 14, end surfaces 16, and side surfaces 18. The insulator portion 10 may have a cuboid shape with a width in the X-axis direction, a length in the Y-axis direction, and a height in the Z-axis direction. The bottom surface 14 may be a mounting surface, and the top surface 12 may be opposed to the bottom surface 14. The end surfaces 16 may connect to the short sides of the top surface 12 and the bottom surface 14. The side surfaces 18 may connect to the long sides of the top surface 12 and the bottom surface 14. The insulator portion 10 may have, for example, a width of 0.05 mm to 0.3 mm, a length of 0.1 mm to 0.6 mm, and a height of 0.05 mm to 0.5 mm.

The insulator portion 10 may include a conductor-containing layer 24 and a pair of non-conductor layers 26a, 26b adjacent to the conductor-containing layer 24 in one of the three axial directions. For example, as in Embodiment 1, the conductor-containing layer 24 may be interposed between the non-conductor layers in the Z-axis direction. In this case, the conductor-containing layer 24 may be exposed in the end surfaces 16 and the side surfaces 18 of the insulator portion 10. The non-conductor layer 26a may constitute the bottom surface 14 of the insulator portion 10, and the non-conductor layer 26b may constitute the top surface 12 of the insulator portion 10. Likewise, in the case where the conductor-containing layer 24 is interposed between the non-conductor layers in the X-axis direction, the conductor-containing layer 24 may be exposed in the top surface 12, the bottom surface 14, the end surfaces 16 of the insulator portion 10, and one of the surfaces of each non-conductor layer may constitute a side surface 18 of the insulator portion 10. Likewise, in the case where the conductor-containing layer 24 is interposed between the non-conductor layers in the Y-axis direction, the conductor-containing layer 24 may be exposed in the top surface 12, the bottom surface 14, the side surfaces 18 of the insulator portion 10, and one of the surfaces of each non-conductor layer may constitute an end surface 18 of the insulator portion 10. In the present disclosure, the positional relationship between the conductor-containing layer 24 and the non-conductor layers 26a, 26b will be described for the representative case where the conductor-containing layer 24 is interposed between the non-conductor layers 26a, 26b in the Z-axis direction. The positional relationship can be similarly converted to the cases where the conductor-containing layer 24 is interposed between the non-conductor layers 26a, 26b in the X-axis direction and the Y-axis direction.

The conductor-containing layer 24 and the non-conductor layers 26a, 26b may be formed of an insulating material composed mainly of a resin. The resin used may cure by heat, light, chemical reactions, etc. Examples of such resins include polyimide, epoxy resin, and liquid crystal polymer. The resin may include ceramic particles such as aluminum oxide serving as a filler. It may also be possible that the conductor-containing layer 24 and the non-conductor layers 26a, 26b are formed of an insulating material composed mainly of glass.

The non-conductor layer 26a and the non-conductor layer 26b may be formed of different materials having different transmissivities of visible light for the same thickness. For example, the non-conductor layer 26a and the non-conductor layer 26b may be formed of different materials containing different amounts of aluminum oxide so as to have different transmissivities of visible light for the same thickness. Therefore, when visible light enters a side surface 18 of the insulator portion 10 (for example, visible light enters a side surface 18 perpendicularly thereto), the transmissivity of the visible light may be different between the non-conductor layer 26a and the non-conductor layer 26b. The conductor-containing layer 24 may be formed of either the same material as any one of the non-conductor layer 26a and the non-conductor layer 26b or a different material than the non-conductor layer 26a and the non-conductor layer 26b.

The internal conductor portion 30 may be provided in the conductor-containing layer 24 of the insulator portion 10. The internal conductor portion 30 may include a plurality of pillared conductive members 32 and a plurality of connecting conductive members 34. The plurality of pillared conductive members 32 and the plurality of connecting conductive members 34 may constitute a coil portion 36. More specifically, the internal conductor portion 30 may have a spiral or helix structure including the plurality of pillared conductive members 32 and the plurality of connecting conductive members 34. The internal conductor portion 30 may have a cycle unit and a coil axis substantially perpendicular to the surface defined by the cycle unit. The coil portion 36 may be a functional portion of the internal conductor portion 30 and configured to achieve an electric performance.

The plurality of pillared conductive members 32 may be divided into two groups that are arranged so as to be opposed to each other in the substantially Y-axis direction. The pillared conductive members 32 constituting the two groups may extend along the Z-axis direction and may be arranged in the X-axis direction at intervals. The plurality of connecting conductive members 34 may be divided into two groups that are formed in parallel with the XY plane and arranged so as to be opposed to each other in the Z-axis direction. The connecting conductive members 34 constituting the two groups may extend along the Y-axis direction and may be arranged in the X-axis direction at intervals. The connecting conductive members 34 may connect between individual ones of the pillared conductive members 32. In this manner, the coil portion 36 in the insulator portion 10 may have the central axis (a coil axis) in the X-axis direction and have a rectangular opening. That is, the coil portion 36 may be wound in a vertical direction.

The internal conductor portion 30 may further include lead-out portions 38, and the coil portion 36 may be connected to the external electrodes 50 via the lead-out portions 38. The lead-out portions 38 may be provided in the same XY plane as the connecting conductive members 34 positioned proximate to the bottom surface 14 of the insulator portion 10 and may be arranged in parallel with the Y-axis direction.

The two external electrodes 50 may serve as external terminals for surface mounting and may be opposed to each other in the Y-axis direction. The external electrodes 50 may cover the opposite Y-axial ends of the bottom surface 14 of the insulator portion 10 and cover the end surfaces 16 of the insulator portion 10 to a predetermined height.

The internal conductor portion 30 may be formed of a metal material such as silver, copper, aluminum, or nickel, or an alloy material thereof. The external electrodes 50 may be formed of a lamination film including a metal material such as silver, copper, aluminum, or nickel, or an alloy material thereof and a tin plating.

A method of manufacturing the electronic component 100 of Embodiment 1 will now be described. A plurality of electronic components 100 of Embodiment 1 may be fabricated simultaneously in a wafer and then diced as device pieces. The electronic component 100 of Embodiment 1 may be formed sequentially from the top surface 12 side of the insulator portion 10.

Figure 3A:
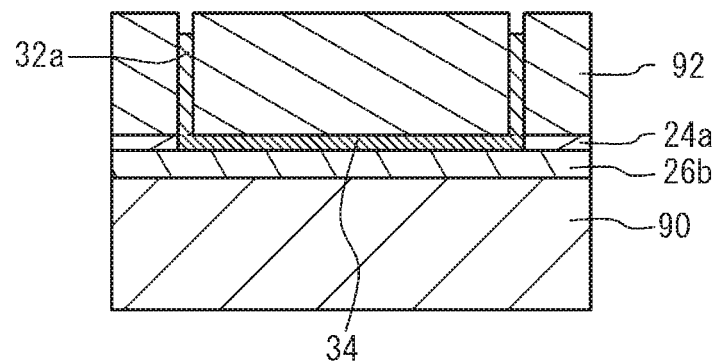
FIGS. 3a, 3b, 3c, 4a, and 4b are sectional views illustrating a method of manufacturing the electronic component according to Embodiment 1.

FIGS. 3a, 3b, 3c, 4a, and 4b are sectional views illustrating a method of manufacturing the electronic component 100 according to Embodiment 1. As shown in FIG. 3a, the non-conductor layer 26b may be formed by printing or applying a resin material or adhering a resin film onto a substrate 90 such as a silicon substrate, a glass substrate, or a sapphire substrate. Formed on the non-conductor layer 26b by electroplating may be the connecting conductive members 34 of the internal conductor portion 30 and a first layer 24a of the conductor-containing layer 24 covering the connecting conductive members 34. The first layer 24a of the conductor-containing layer may be formed by printing or applying a resin material or adhering a resin film. The first layer 24a of the conductor-containing layer 24 may then be ground to expose the surfaces of the connecting conductive members 34. Next, a seed layer (not shown) may be formed on the first layer 24a of the conductor-containing layer 24, and then a resist film 92 may be formed on the seed layer so as to have an opening therein. Following the formation of the resist film 92, a descum treatment may be performed to remove the resist remaining in the opening. Subsequently, upper portions 32a of the pillared conductive members 32 may be formed in the opening of the resist film 92 by electroplating.

Figure 3B:
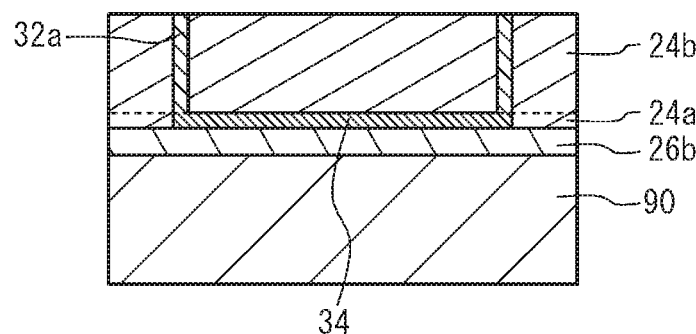

As shown in FIG. 3b, the resist layer 92 and the seed layer may be removed, and then a second layer 24b of the conductor-containing layer 24 covering the upper portions 32a of the pillared conductive members 32 may be formed. The second layer 24b of the conductor-containing layer 24 may be formed by printing or applying a resin material or adhering a resin film. The second layer 24b of the conductor-containing layer 24 may then be ground to expose the surfaces of the upper portions 32a of the pillared conductive members 32.

Figure 3C:
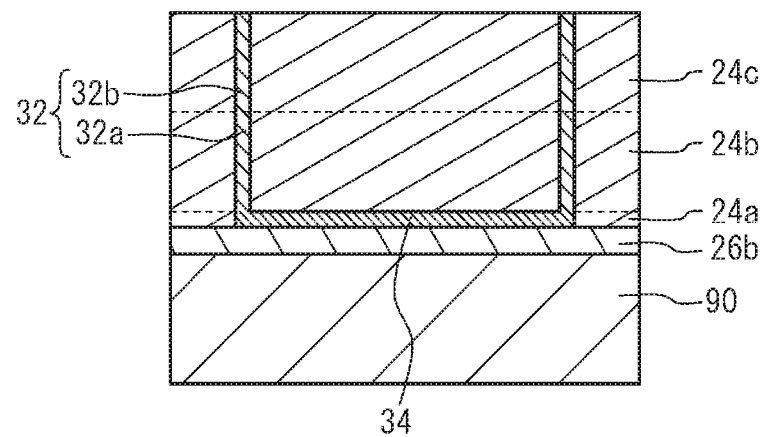

As shown in FIG. 3c, formed on the second layer 24b of the conductor-containing layer 24 may be lower portions 32b of the pillared conductive members 32 and a third layer 24c of conductor-containing layer 24 covering the lower portions 32b of the pillared conductive members 32. The lower portions 32b of the pillared conductive members 32 may be formed to connect with the upper portions 32a of the pillared conductive members 32. The lower portions 32b of the pillared conductive members 32 and the third layer 24c of the conductor-containing layer 24 may be formed by the same method as the upper portions 32a of the pillared conductive members 32 and the second layer 24b of the conductor-containing layer 24.

Figure 4A:
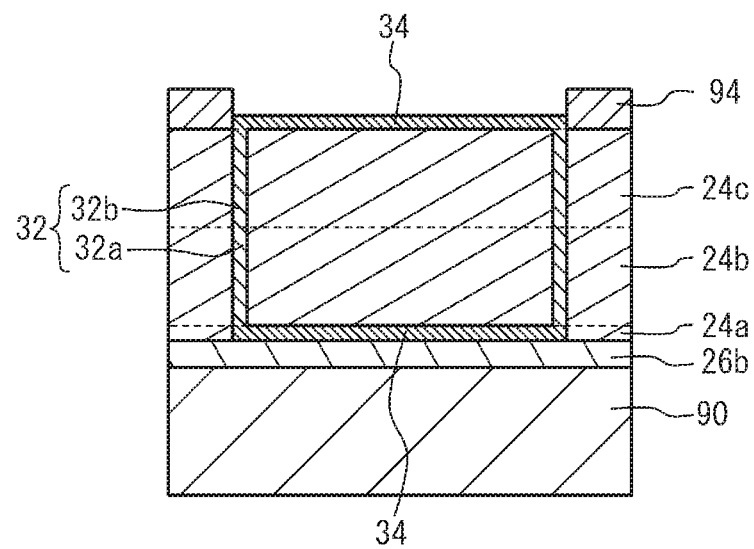

As shown in FIG. 4a, a resist layer 94 including a seed layer (not shown) and an opening may be formed on the third layer 24c of the conductor-containing layer 24, and the connecting conductive members 34 and the lead-out portions 38 (not shown in FIG. 4a) of the internal conductor portion 30 may be formed in the opening of the resist film 94 by electroplating. Prior to the formation of the connecting conductive members 34 and the lead-out portions 38, a descum treatment may be performed to remove the resist remaining in the opening of the resist film 94.

Figure 4B:
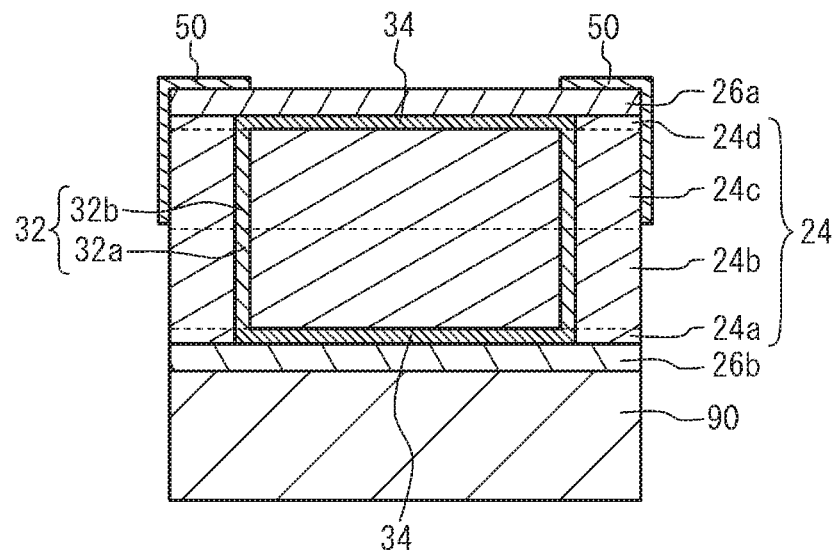

As shown in FIG. 4b, the resist film 94 and the seed layer may be removed, and then a fourth layer 24d of the conductor-containing layer 24 covering the connecting conductive members 34 and the lead-out portions 38 may be formed on the third layer 24c of the conductor-containing layer 24. The conductor-containing layer 24 may be constituted by the first layer 24a to the fourth layer 24d. Next, the non-conductor layer 26a may be formed on the fourth layer 24d of the conductor-containing layer 24 by, e.g., printing or applying a resin material or adhering a resin film. Then, the external electrodes 50 may be formed on the surface of the insulator portion 10. The electronic component 100 of Embodiment 1 may be thus formed.

In Embodiment 1, the insulator portion 10 may include the non-conductor layer 26a and the non-conductor layer 26b having different transmissivities of visible light entering the side surfaces 18, for example. Therefore, when visible light enters a side surface 18 of the insulator portion 10, the non-conductor layer 26a and the non-conductor layer 26b may exhibit different shades of color. Thus, it is possible to identify the top-bottom direction of the electronic component 100. In addition, depending on the transmissivity of visible light of the conductor-containing layer 24, it may be possible to identify the shape of at least a part of the internal conductor portion 30, and thereby to identify the direction thereof. Thus, since the direction of the electronic component 100 can be identified using visible light, it may be possible to eliminate the need of large scale facilities and suppress increase in cost.

Figure 5A:
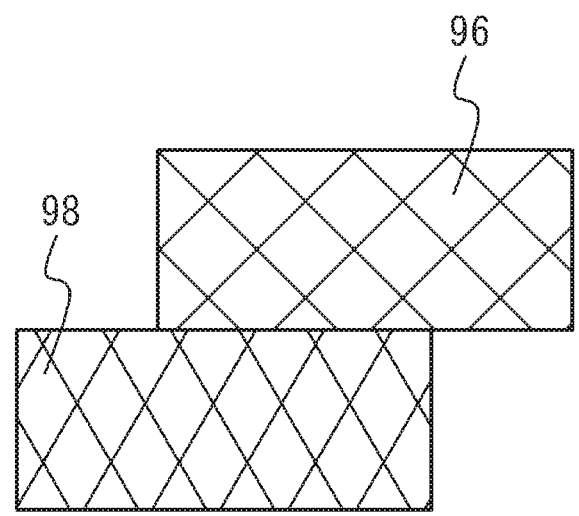

In Embodiment 1, it may be preferable that the difference in transmissivity of visible light between the non-conductor layer 26a and the non-conductor layer 26b is equal to or greater than 10%, so as to facilitate identification of the shades of color of the non-conductor layer 26a and the non-conductor layer 26b. This is based on the following experiment results. FIGS. 5a and 5b illustrate an experiment of identifying films. As shown in FIG. 5a, a film 96 made of a material 1 having a lower transmissivity of visible light and a film 98 made of a material 2 having a higher transmissivity of visible light were arranged adjacent to each other. As shown in FIG. 5b, the transmissivities of visible light of the material 1 used in the film 96 and the material 2 used in the film 98 were combined variously, and it was tested whether the shades of color can be identified using a camera. The film 96 and the film 98 had a width of 1.0 mm, a height of 0.5 mm, and a depth of 0.5 mm. The camera used was CS8550Di from TOSHIBA TELI Corporation, with a shutter speed of 1/500 sec. and a gain volume set at the middle. The distance between the camera and the films 96, 98 was 71 mm, and a light emitting white light was used. As a result, when the difference in transmissivity is greater than 10%, the shades were identified, as shown in FIG. 5b.

In Embodiment 1, the non-conductor layer 26a and the non-conductor layer 26b may have different transmissivities of visible light. It may also be possible that these non-conductor layers have different transmissivities of a light beam other than visible light (e.g., an infrared light beam). In this case, since the direction of the electronic component 100 can be identified by applying infrared light to the electronic component 100, it may be possible to eliminate the need of large scale facilities and suppress increase in cost. When infrared light is used, the identification elements are not recognized by the visual sense of a human but can be recognized by application of infrared light. The above light beam may preferably not include ultraviolet rays. The ultraviolet rays may adversely affect human bodies.

In Embodiment 1, the non-conductor layer 26a and the non-conductor layer 26b may be formed of different materials having different transmissivities of visible light for the same thickness. Thus, the transmissivities of visible light of the non-conductor layer 26a and the non-conductor layer 26b can be readily differentiated.

In Embodiment 1, the non-conductor layer 26a and the non-conductor layer 26b may contain different amounts of aluminum oxide so as to have different transmissivities of visible light for the same thickness, but this is not limitative. It may also be possible that the non-conductor layer 26a and the non-conductor layer 26b may contain different amounts of metal oxide other than aluminum oxide. Examples of metal oxides other than aluminum oxide include cobalt oxide, manganese oxide, titanium oxide, magnesium oxide, copper oxide, iron oxide, and zinc oxide. It may also be possible the non-conductor layer 26a and the non-conductor layer 26b contain at least one of these metal oxides. Further, it may also be possible that the non-conductor layer 26a and the non-conductor layer 26b contain different amounts of organic coloring matter, silicon oxide, graphite, or carbonized silicon. Organic coloring matters can exhibit clear colors in a small amount, and thus may be less prone to affect electrical characteristics of the material in the electronic component such as permittivity, magnetic permeability, and insulation characteristics. There are numerous types of organic coloring matters having different chemical structures. Most of the organic coloring matters, not to be listed herein, are suitable for the purpose of the present invention.

Figure 6A:
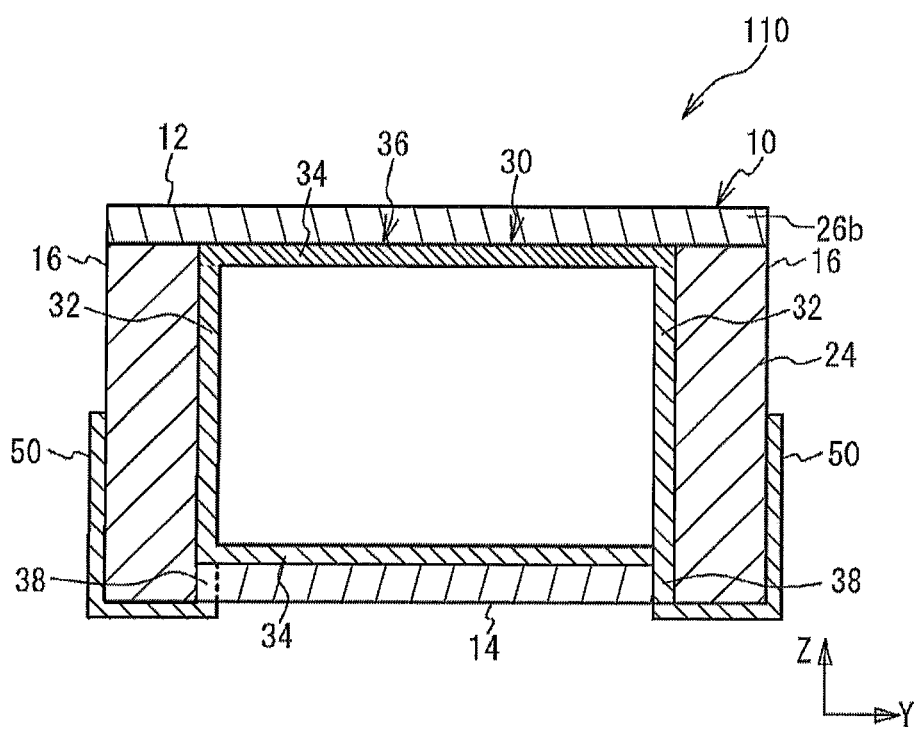
FIG. 6a is a side sectional view of the electronic component according to Variation 1 of Embodiment 1.
Figure 6B:
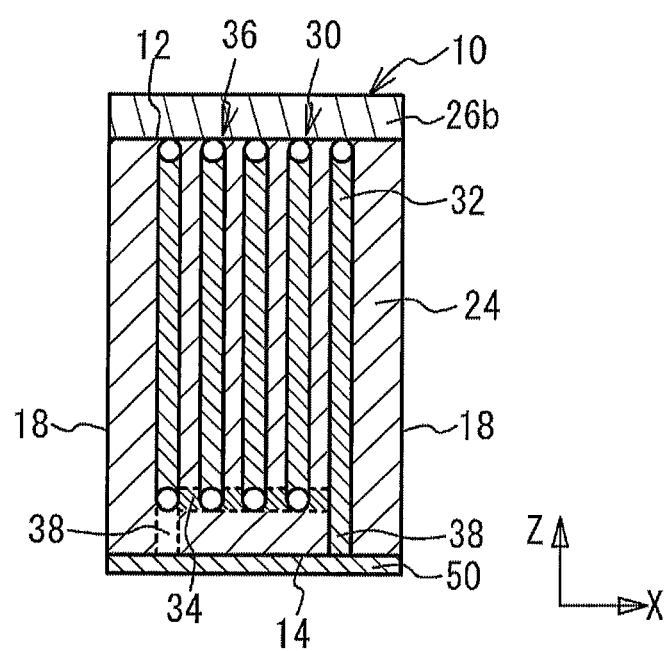
FIG. 6b is an end sectional view of the electronic component according to Variation 1 of Embodiment 1.

FIG. 6a is a side sectional view of the electronic component 110 according to Variation 1 of Embodiment 1, and FIG. 6b is an end sectional view of the same. As shown in FIGS. 6a and 6b, the electronic component 110 of Variation 1 of Embodiment 1 may not include the non-conductor layer 26a, and the conductor-containing layer 24 and the non-conductor layer 26b may be formed of different materials having different transmissivities of visible light for the same thickness. Therefore, when, for example, visible light enters a side surface 18 of the insulator portion 10, the transmissivity of the visible light may be different between the conductor-containing layer 24 and the non-conductor layer 26b. Other features of the electronic component 110 may be the same as for Embodiment 1 and will not be described herein.

In Variation 1 of Embodiment 1, when visible light enters a side surface 18 of the insulator portion 10, the conductor-containing layer 24 and the non-conductor layer 26b may exhibit different shades of color. Thus, the direction of the electronic component 110 can be identified.

In Variation 1 of Embodiment 1, the non-conductor layer 26b may be provided on the top surface 12 side of the conductor-containing layer 24, and no non-conductor layer may be provided on the bottom surface 14 side. It may also be possible that a non-conductor layer is provided on the bottom surface 14 side and no non-conductor layer is provided on the top surface 12 side.

Embodiment 2

Figure 7A:
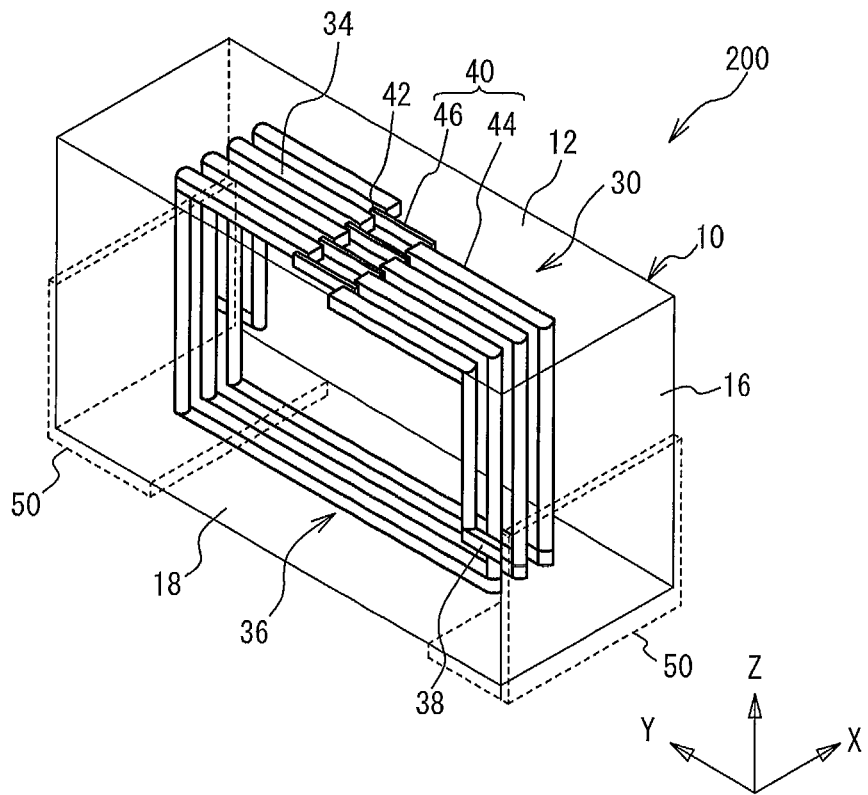
FIG. 7a is a perspective view of the electronic component according to Embodiment 2.
Figure 7B:
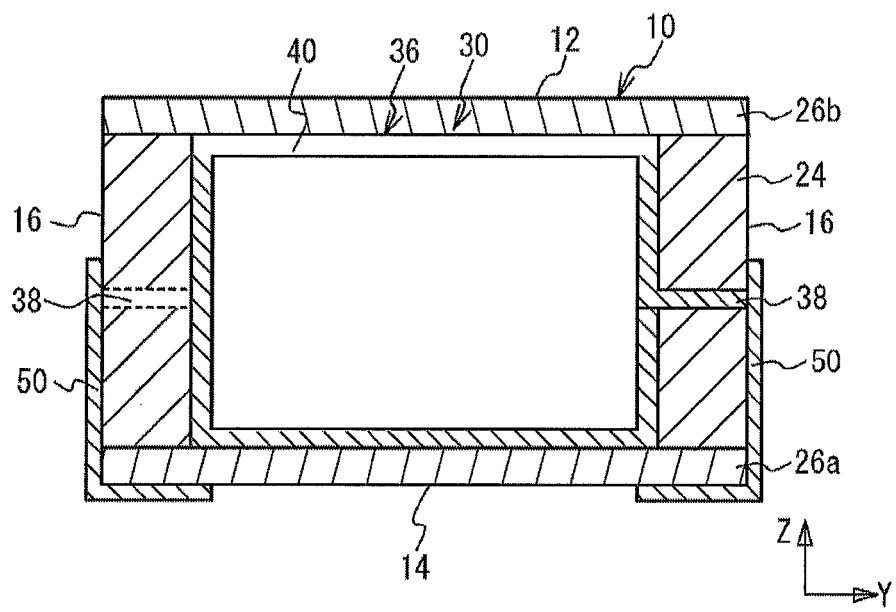
FIG. 7b is a side sectional view of the electronic component according to Embodiment 2.

FIG. 7a is a perspective view of the electronic component 200 according to Embodiment 2, and FIG. 7b is a side sectional view of the same. As shown in FIGS. 7a and 7b, the internal conductor portion 30 in the electronic component 200 of Embodiment 2 may include conductive patterns 40, via-hole conductors 42, and the lead-out portions 38. The via-hole conductors 42 may electrically connect a plurality of conductive patterns 40. A conductive pattern 40 may include, for example, a C-shaped pattern 44 and an I-shaped pattern 46 combined together.

Figure 8:
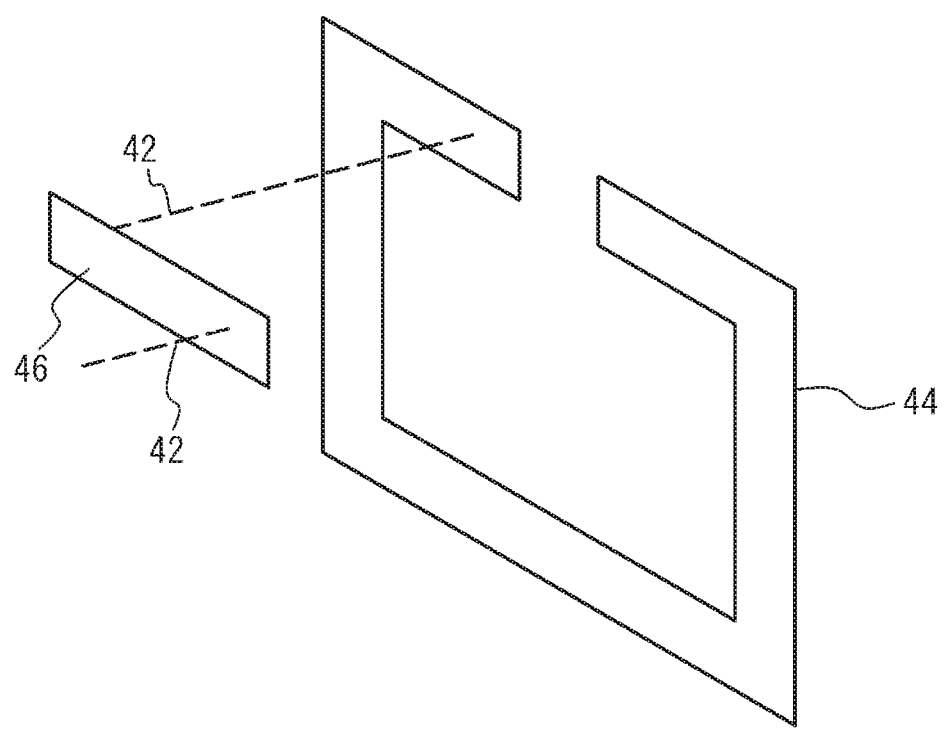
FIG. 8 illustrates a C-shaped pattern and an I-shaped pattern.

FIG. 8 illustrates a C-shaped pattern 44 and an I-shaped pattern 46. As shown in FIG. 8, the C-shaped pattern 44 may be a polygonal conductive pattern having three or more angles. For example, the C-shaped pattern 44 may have a substantially rectangle shape with four angles, and one of the sides of the substantially rectangle shape may be partially missing. Examples of the substantially rectangle shape may include a shape that can approximate a rectangle such as an oval, in addition to the rectangular shape as shown in FIG. 8. As shown in FIG. 8, the substantially rectangle shape may have four angles, or if the substantially rectangle shape does not have distinct angles, the substantially rectangle shape may have portions deemed to be angles when it approximates a rectangle. The broken lines in FIG. 8 may indicate the positions in which the via-hole conductors 42 are formed.

The I-shaped pattern 46 may make up the missing part of the C-shaped pattern 44 having the substantially rectangular shape. The I-shaped pattern 46 may have a straight shape as shown in FIG. 8 or a curved shape constituting a part of an oval, so as to conform to the actual shape of the substantially rectangular shape. The combined use of the C-shaped pattern 44 and the I-shaped pattern 46 can stabilize the dimensions of the coil portion and narrow the tolerance of the inductance. The I-shaped pattern 46 may preferably have a length larger than that of the missing part of the C-shaped pattern 44. This may ensure the electric connection.

As shown in FIGS. 7a and 7b, the conductor-containing layer 24 and the non-conductor layers 26a, 26b may be formed of different materials containing, for example, different amounts of aluminum oxide so as to have different transmissivities of visible light for the same thickness. Therefore, when visible light enters a side surface 18 of the insulator portion 10 (for example, visible light enters a side surface 18 perpendicularly thereto), the transmissivity of the visible light may be different between the conductor-containing layer 24 and the non-conductor layers 26a, 26b. The aluminum oxide content of the conductor-containing layer 24 may be equal to or less than 30 wt % for example, and may particularly be 1 wt % to 15 wt % for example. The aluminum oxide content of the non-conductor layers 26a, 26b may be equal to or less than 40 wt % for example, and may particularly be 40 wt % to 60 wt % for example. The transmissivity of visible light of the conductor-containing layer 24 may be higher than that of the non-conductor layers 26a, 26b. The conductor-containing layer 24 may be transparent to visible light, for example. The transparency to visible light may involve such a transmissivity of visible light that the interior of the conductor-containing layer 24 is visible, that is, for example, a transmissivity of visible light of 70% or higher. The non-conductor layer 26a and the non-conductor layer 26b may be formed of either the same material or different materials. Other features of the electronic component 200 may be the same as for Embodiment 1 and will not be described herein.

A method of manufacturing the electronic component 200 according to Embodiment 2 will now be described. The first step of the method of manufacturing the electronic component 200 of Embodiment 2 may be to prepare a plurality of insulating green sheets. The green sheets may be formed by applying an insulating slurry made mainly of glass, etc. onto a film by the doctor blade method, etc. The insulating material used may also be a dielectric ceramic, ferrite, a soft magnetic alloy material, or a resin containing an insulating material, in addition to the material composed mainly of glass. The green sheets may be subjected to laser processing or the like to form through-holes in the positions where the via-hole conductors 42 are to be formed. Then, an electrically conductive paste, which is a precursor of the conductive pattern 40 and the via-hole conductors 42, may be printed at predetermined positions on the green sheets by screen masking or the like. Examples of the main component of the electrically conductive paste may include metals such as silver and copper.

Next, the green sheets may be stacked together in a predetermined order and pressed in the lamination direction for pressure bonding thereof. The insulating green sheets pressure-bonded together are cut into chips and then fired at a temperature (e.g., about 800° C. to 900° C.) to form the insulator portion 10 containing the internal conductor portion 30. Next, the external electrodes 50 may be formed in predetermined positions on the insulator portion 10. The external electrodes 50 may be formed by applying an electrode paste composed mainly of silver or copper, baking the electrode paste at a temperature (e.g., about 680° C. to 900° C.), and then electroplating it. The electroplating process may use copper, nickel, or tin, etc. The electronic component 200 of Embodiment 2 may be thus formed.

In Embodiment 2, when visible light enters a side surface 18 of the insulator portion 10, the transmissivity of the visible light may be different between the conductor-containing layer 24 and the non-conductor layers 26a, 26b. The conductor-containing layer 24 may have a higher transmissivity of visible light than the non-conductor layers 26a, 26b and thus may be transparent to visible light. Thus, when visible light is applied to a side surface 18 of the insulator portion 10, the internal conductor portion 30 contained in the conductor-containing layer 24 may become visible. The direction of the electronic component 200 can be identified based on how the internal conductor portion 30 appears. In addition, foreign substances contained in the conductor-containing layer 24 can be found.

In Embodiment 2, the conductor-containing layer 24 and the non-conductor layers 26a, 26b may be formed of different materials having different transmissivities of visible light for the same thickness, but this is not limitative. It may also be possible that any one of the non-conductor layers 26a, 26b may be formed of a material having a different transmissivity of visible light than the conductor-containing layer 24 for the same thickness, and the other may be formed of the same material as the conductor-containing layer 24. In this case, one of the non-conductor layers 26a, 26b formed of the same material as the conductor-containing layer 24 can be deemed to be integrated with the conductor-containing layer 24. Therefore, the insulator portion 10 may include the conductor-containing layer 24 and a non-conductor layer provided on the conductor-containing layer 24 on the top surface 12 side or the bottom surface 14 side. That is, the non-conductor layer may be provided on the conductor-containing layer 24 on at least one of the top surface 12 side and the bottom surface 14 side.

Embodiment 3

Figure 9A:
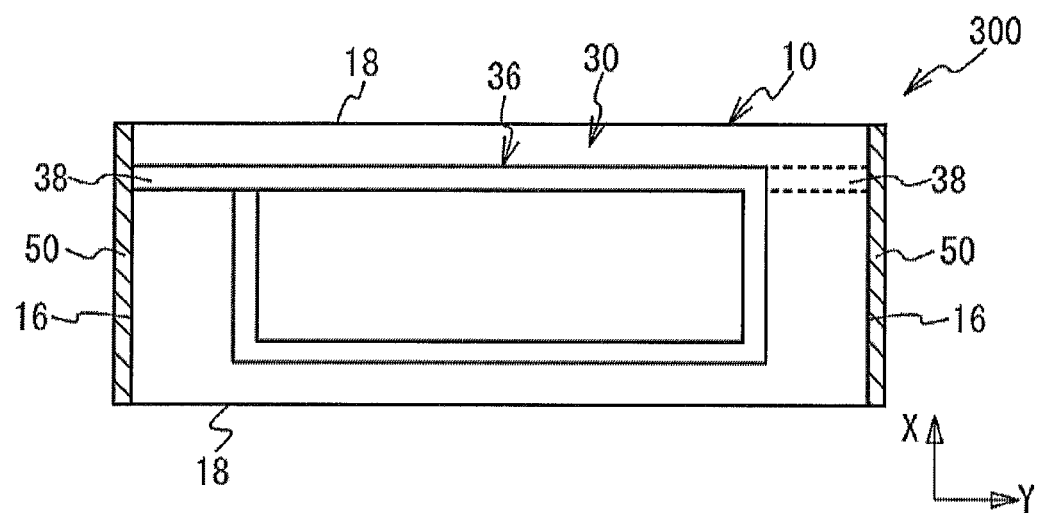
FIG. 9a is a top sectional view of the electronic component according to Embodiment 3.
Figure 9B:
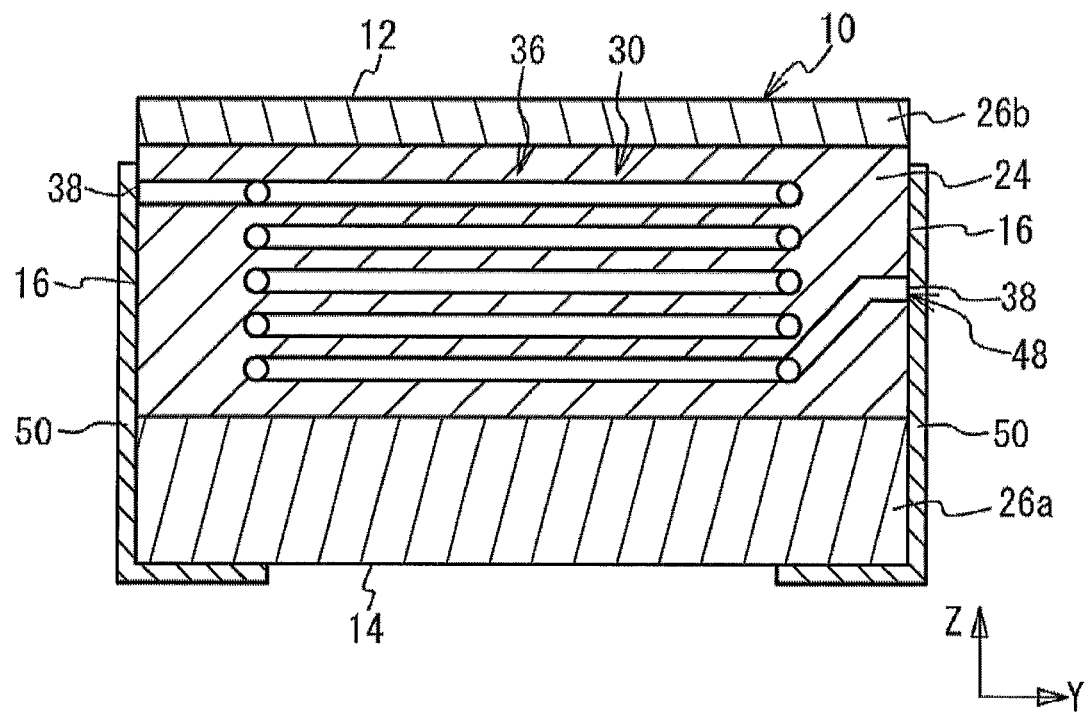
FIG. 9b is a side sectional view of the electronic component according to Embodiment 3.
Figure 9C:
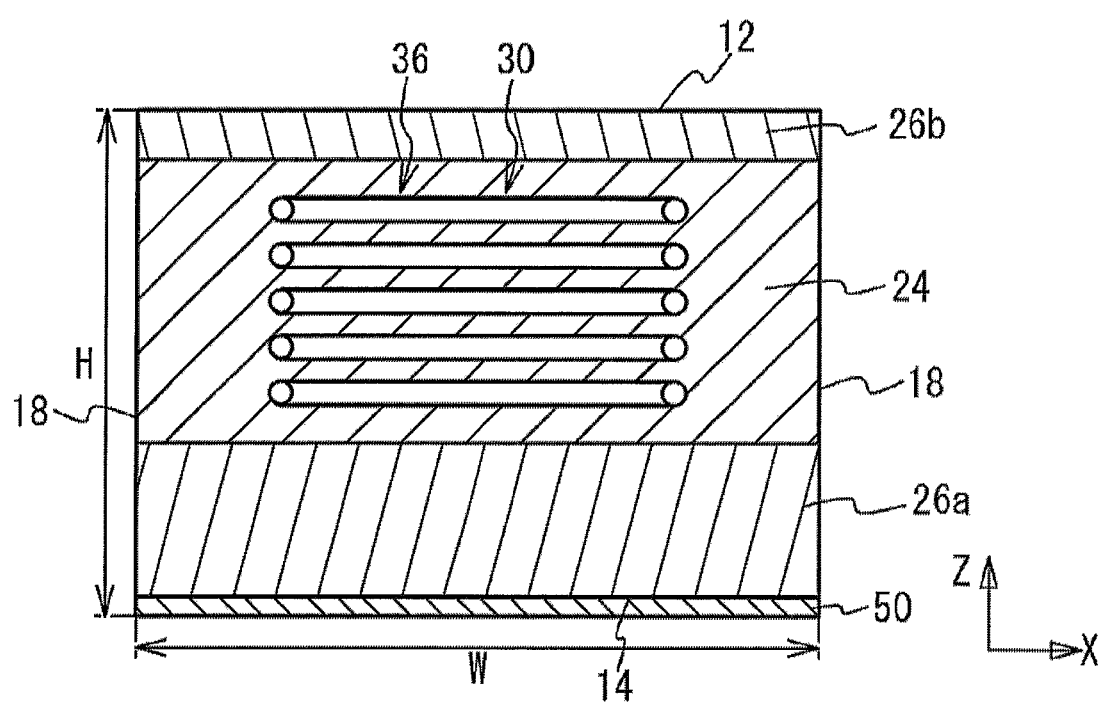
FIG. 9c is an end sectional view of the electronic component according to Embodiment 3.

FIG. 9a is a top sectional view of the electronic component 300 according to Embodiment 3, FIG. 9b is a side sectional view of the same, and FIG. 9c is an end sectional view of the same. As shown in FIGS. 9a to 9c, in the electronic component 300 of Embodiment 3, the length W in the X-axis direction (the width direction) may be larger than the length H in the Z-axis direction (the height direction). In addition, the coil portion 36 formed in the insulator portion 10 may have the central axis (a coil axis) in the Z-axis direction (the height direction) and have a rectangular opening. That is, the coil portion 36 may be wound in a horizontal direction. The lead-out portions 38 may be provided closer to the top surface 12 than may be the portion of the coil portion 36 closest to the bottom surface 14. Thus, the connection portion 48 between the internal conductor portion 30 and the external electrodes 50 may be positioned closer to the top surface 12 than may be the portion of the coil portion 36 closest to the bottom surface 14.

The conductor-containing layer 24 containing the internal conductor portion 30 may be offset from the middle of the insulator portion 10 toward the top surface 12. That is, the thickness of the non-conductor layer 26a may be larger than that of the non-conductor layer 26b. The conductor-containing layer 24 and the non-conductor layers 26a, 26b may be formed of different materials containing, for example, different amounts of aluminum oxide so as to have different transmissivities of visible light for the same thickness. Therefore, when visible light enters a side surface 18 of the insulator portion 10 (for example, visible light enters a side surface 18 perpendicularly thereto), the transmissivity of the visible light may be different between the conductor-containing layer 24 and the non-conductor layers 26a, 26b. The non-conductor layer 26a and the non-conductor layer 26b may be formed of either the same material or different materials. Other features of the electronic component 300 may be the same as for Embodiment 1 and will not be described herein.

In Embodiment 3, when visible light enters a side surface 18 of the insulator portion 10, the transmissivity of the visible light may be different between the conductor-containing layer 24 and the non-conductor layers 26a, 26b. The conductor-containing layer 24 containing the internal conductor portion 30 may be offset from the middle of the insulator portion 10 toward the top surface 12. Therefore, when visible light enters a side surface 18 of the insulator portion 10, the conductor-containing layer 24 may exhibit a different shade of color than the non-conductor layers 26a, 26b. Thus, the position of the conductor-containing layer 24 containing the internal conductor portion 30 can be identified Since the conductor-containing layer 24 is offset from the middle of the insulator portion 10, the position of the conductor-containing layer 24 can be identified, and thus the direction of the electronic component 300 can be identified.

In Embodiment 3, the length W of the insulator portion 10 in the width direction (the X-axis direction) may be larger than the length H thereof in the height direction (the Z-axis direction) (W>H), and the coil portion 36 (the functional portion) may be positioned closer to the top surface 12 of the insulator portion 10. Thus, the offset position of the functional portion may identify the direction. In addition, even when the electronic component has a small height, the coil portion 36 may be positioned distant from the bottom surface 14 serving as a mounting surface. Therefore, after the electronic component 300 is mounted on a mounting portion, the effect of the stray capacitance imparted to the coil portion 36 from the mounting portion can be reduced, and the change of characteristics can be suppressed.

In Embodiment 3, the connection portion 48 between the internal conductor portion 30 and the external electrodes 50 may be positioned closer to the top surface 12 than may be the portion of the coil portion 36 closest to the bottom surface 14. Thus, the position of the connection portion 48 closer to the top surface 12 may identify the direction. In addition, after the electronic component 300 is mounted on a mounting portion, the effect of the stray capacitance imparted to the coil portion 36 from the mounting portion can be reduced, as the distance between the mounting surface and the connection portion 48 is larger.

In Embodiment 3, the non-conductor layers 26a, 26b may preferably have a higher specific gravity than the conductor-containing layer 24. Since the non-conductor layers 26a, 26b have a higher specific gravity than the conductor-containing layer 24, there may be a large amount of gap formed in the conductor-containing layer 24 to adjust the contraction ratio. This gap may vary the transmissivity of the conductor-containing layer 24 so as to enable identification of the direction and may also reduce the permittivity. This may reduce the stray capacitance between the conductive members in the coil portion 36, increase the self-resonant frequency, and improve the frequency characteristics of Q (Quality factor).

In Embodiment 3, when the insulator portion 10 contains Si, the conductor-containing layer 24 may preferably have a larger Si content than the non-conductor layers 26a, 26b. The larger Si content may vary the transmissivity of the conductor-containing layer 24 so as to enable identification of the direction and may also reduce the permittivity. This may reduce the stray capacitance between the conductive members in the coil portion 36, increase the self-resonant frequency, and improve the frequency characteristics of Q (Quality factor).

In Embodiment 3, the conductor-containing layer 24 may be offset from the middle of the insulator portion 10 toward the top surface 12, but this is not limitative. It may also be possible that the conductor-containing layer 24 may be offset from the middle of the insulator portion 10 toward the bottom surface 14 or may be offset from the middle of the insulator portion 10 in the direction parallel with the surface entered by the light beam. In either case, the varied transmissivity of the conductor-containing layer 24 may identify the direction.

Figure 10A:
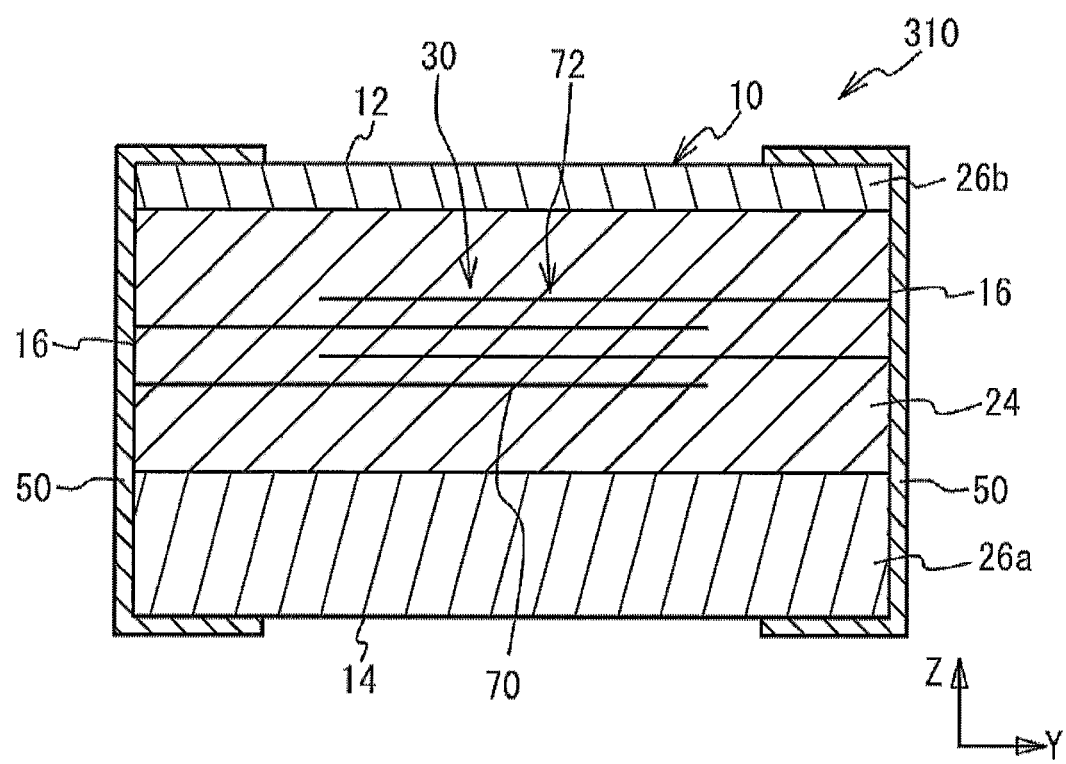
FIG. 10a is a side sectional view of the electronic component according to Variation 1 of Embodiment 3.
Figure 10B:
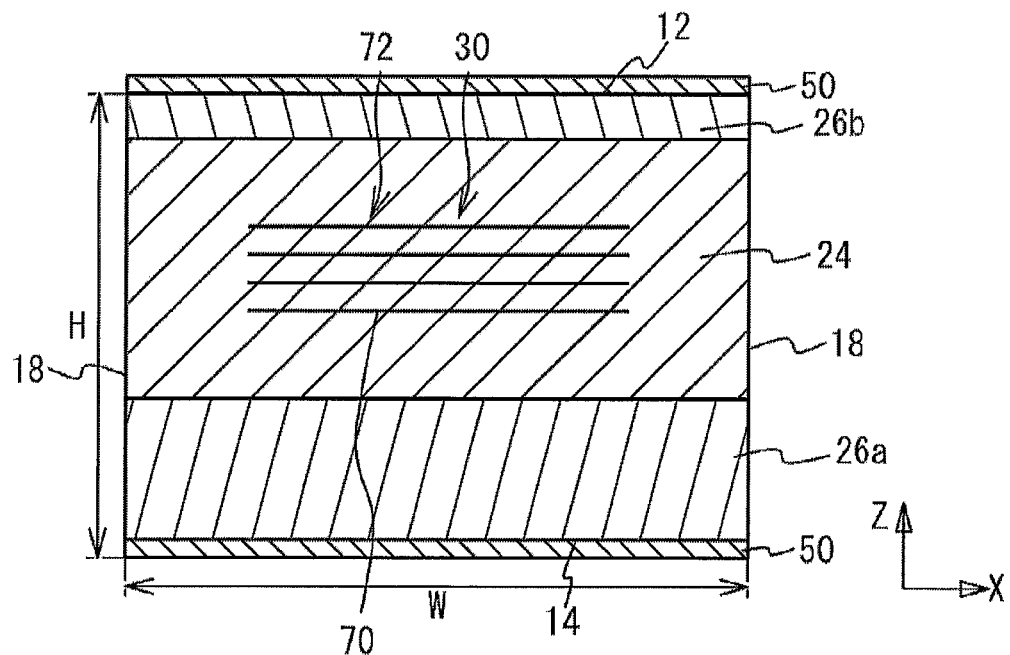
FIG. 10b is an end sectional view of the electronic component according to Variation 1 of Embodiment 3.

FIG. 10a is a side sectional view of the electronic component 310 according to Variation 1 of Embodiment 3, and FIG. 10b is an end sectional view of the same. In Variation 1 of Embodiment 3, the electronic component may be a capacitor element. As shown in FIGS. 10a and 10b, the electronic component 310 of Variation 1 of Embodiment 3 may include a plurality of crossed electrodes 70 formed of the internal conductor portion 30. The plurality of crossed electrodes 70 may form a capacitor portion 72. The capacitor portion 72 may be a functional portion of the internal conductor portion 30 and configured to achieve an electric performance. Other features of the electronic component 310 may be the same as for Embodiment 3 and will not be described herein.

In Variation 1 of Embodiment 3, when visible light enters a side surface 18 of the insulator portion 10, the direction of the electronic component 310 can be identified.

In Variation 1 of Embodiment 3, the length W of the insulator portion 10 in the width direction (the X-axis direction) may be larger than the length H thereof in the height direction (the Z-axis direction) (W>H), and the capacitor portion 72 (the functional portion) may be positioned closer to the top surface 12 of the insulator portion 10. Thus, the offset position of the functional portion may identify the direction. In addition, even when the electronic component has a small height, the capacitor portion 72 may be positioned distant from the bottom surface 14 serving as a mounting surface. Therefore, after the electronic component 300 is mounted on a mounting portion, the effect of the stray capacitance imparted to the capacitor portion 72 from the mounting portion can be reduced, and the change of characteristics can be suppressed.

In Variation 1 of Embodiment 3, the non-conductor layers 26a, 26b may preferably have a higher specific gravity than the conductor-containing layer 24. Since the non-conductor layers 26a, 26b have a higher specific gravity than the conductor-containing layer 24, there may be a large amount of gap formed in the conductor-containing layer 24 to adjust the contraction ratio. This gap may vary the transmissivity of the conductor-containing layer 24 so as to enable identification of the direction.

In Variation 1 of Embodiment 3, when the insulator portion 10 contains Si, the conductor-containing layer 24 may preferably have a smaller Si content than the non-conductor layers 26a, 26b. The smaller Si content may vary the transmissivity of the conductor-containing layer 24 so as to enable identification of the direction and may also increase the permittivity. When this feature is employed in the design, a capacitor having a large capacitance can be obtained.

In Variation 1 of Embodiment 3, the conductor-containing layer 24 may be offset from the middle of the insulator portion 10 toward the top surface 12, but this is not limitative. It may also be possible that the conductor-containing layer 24 may be offset from the middle of the insulator portion 10 toward the bottom surface 14 or may be offset from the middle of the insulator portion 10 in the direction parallel with the surface entered by the light beam. In either case, the varied transmissivity of the conductor-containing layer 24 may identify the direction.

Figure 11A:
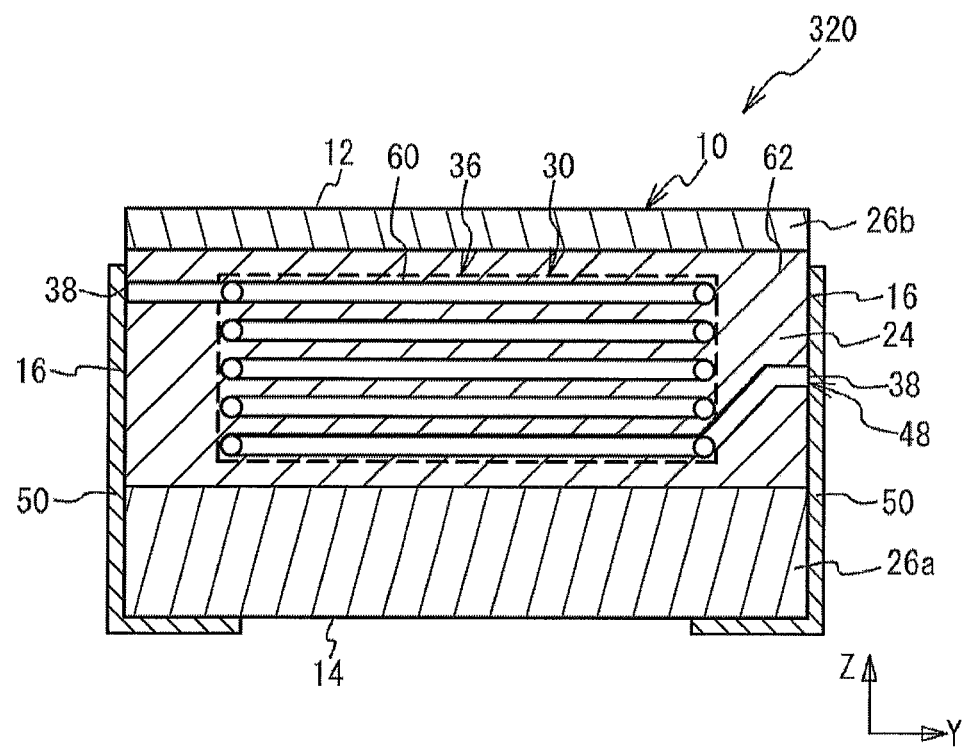
FIG. 11a is a side sectional view of the electronic component according to Variation 2 of Embodiment 3.
Figure 11B:
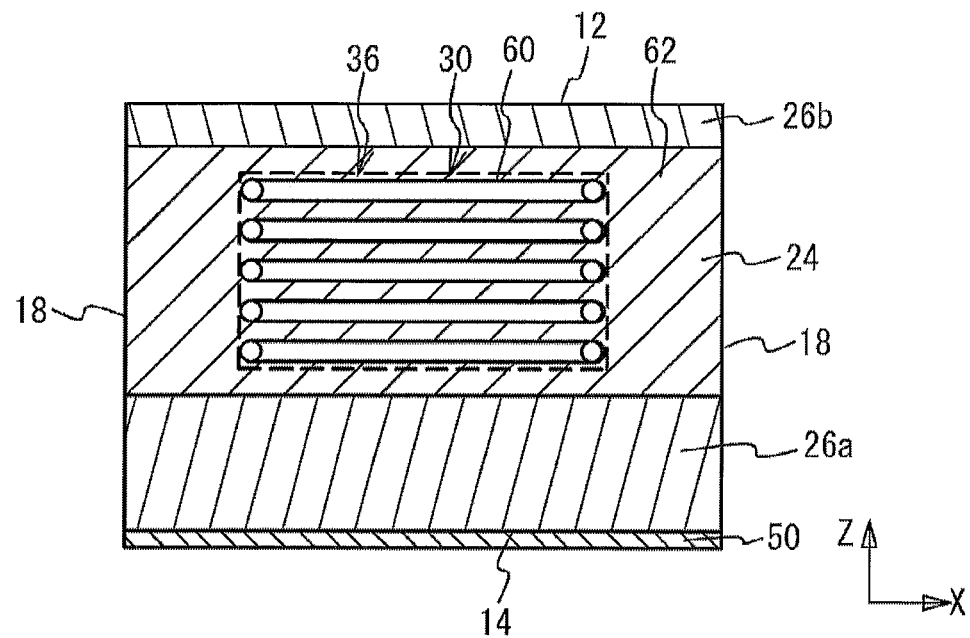
FIG. 11b is an end sectional view of the electronic component according to Variation 2 of Embodiment 3.

FIG. 11a is a side sectional view of the electronic component 320 according to Variation 2 of Embodiment 3, and FIG. 11b is an end sectional view of the same. In Variation 2 of Embodiment 3, the electronic component may be a coil element, as in Embodiment 3. As shown in FIGS. 11a and 11b, in the electronic component 320 of Variation 2 of Embodiment 3, the conductor-containing layer 24 may include a region 60 containing the coil portion 36 of the internal conductor portion 30 and a region 62 surrounding the region 60. The region 60 and the surrounding region 62 may be formed of different materials having different transmissivities of light for the same thickness. The region 60 may be a functional region that achieves an electric performance by the coil portion 60 and surrounds the coil portion 60. The region 62 may be formed of, e.g., the same material as the non-conductor layers 26a, 26b. Other features of the electronic component 320 may be the same as for Embodiment 3 and will not be described herein.

Figure 12A:
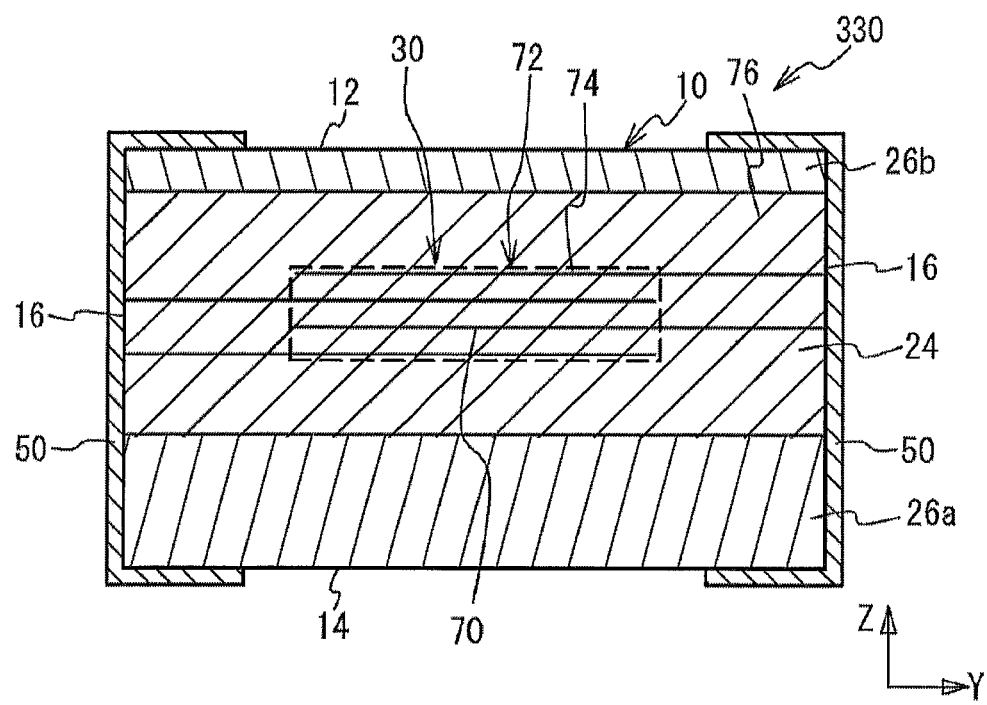
FIG. 12a is a side sectional view of the electronic component according to Variation 3 of Embodiment 3.
Figure 12B:
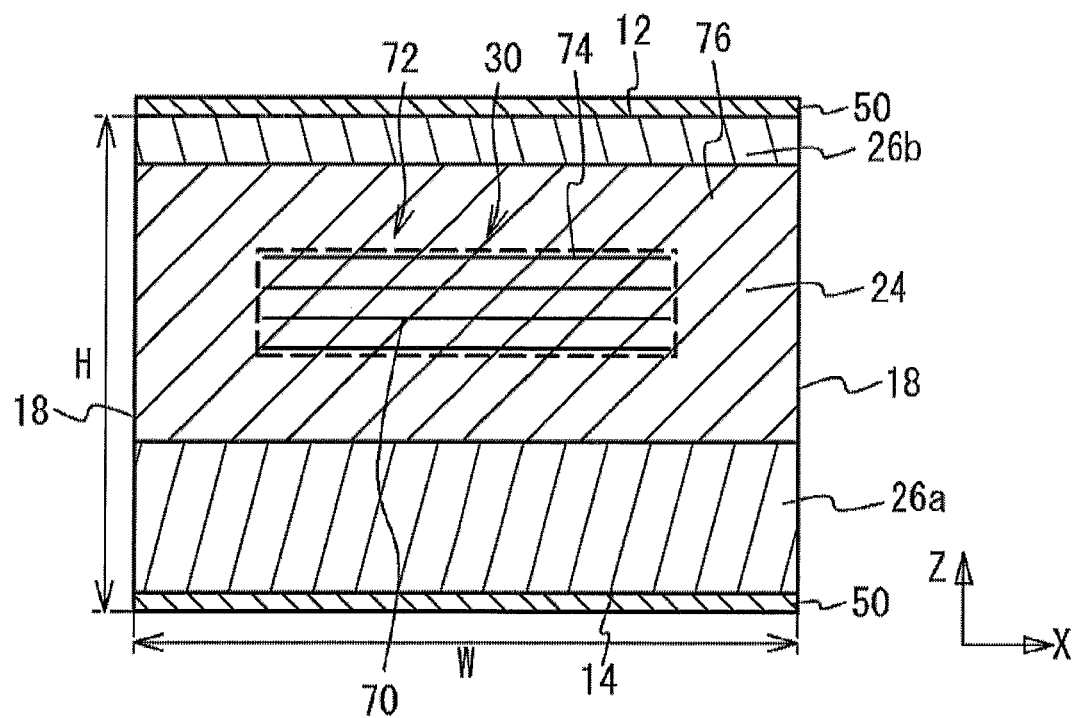
FIG. 12b is an end sectional view of the electronic component according to Variation 3 of Embodiment 3.

FIG. 12a is a side sectional view of the electronic component 330 according to Variation 3 of Embodiment 3, and FIG. 12b is an end sectional view of the same. In Variation 3 of Embodiment 3, the electronic component may be a capacitor element, as in Variation 1 of Embodiment 3. As shown in FIGS. 12a and 12b, in the electronic component 330 of Variation 3 of Embodiment 3, the conductor-containing layer 24 may include a region 74 containing the capacitor portion 72 constituted by the crossed electrodes 70 of the internal conductor portion 30 and a region 76 surrounding the region 74. The region 74 and the surrounding region 76 may be formed of different materials having different transmissivities of light for the same thickness. The region 74 may be a functional region that achieves an electric performance by the capacitor portion 72 and surrounds the capacitor portion 72. The region 74 may be formed of, e.g., the same material as the non-conductor layers 26a, 26b. Other features of the electronic component 330 may be the same as for Embodiment 3 and will not be described herein.

In Variations 2 and 3 of Embodiment 3, when visible light enters a side surface 18 of the insulator portion 10, the transmissivity of the visible light may be different between the conductor-containing layer 24 and the non-conductor layers 26a, 26b. Thus, the direction of the electronic component can be identified.

Figure 13A:
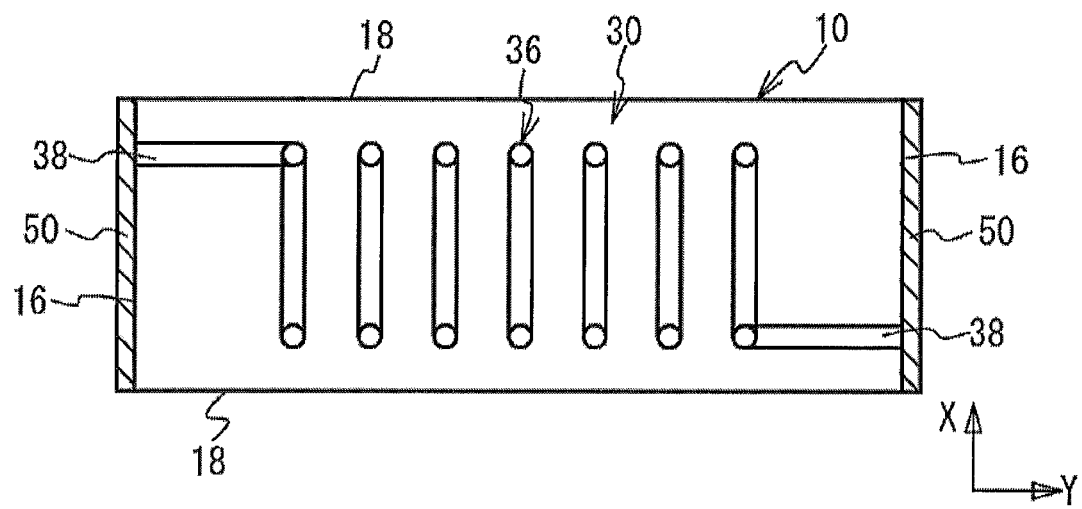
FIGS. 13a to 13c illustrate the electronic component having a coil portion wound in a vertical direction in another way.
Figure 13B:
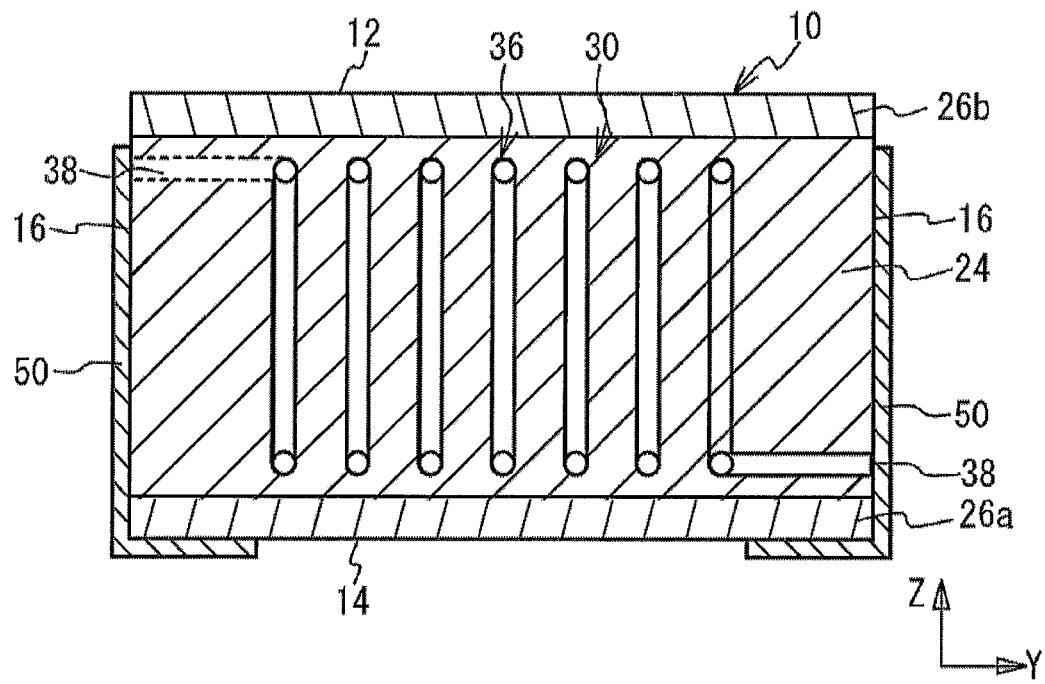
Figure 13C:
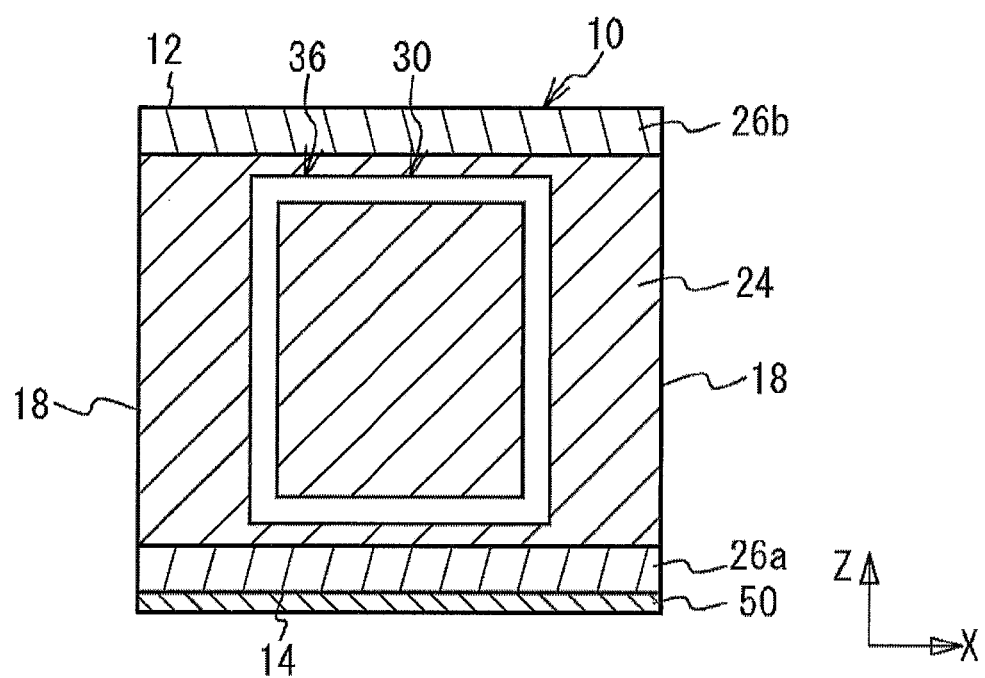

Embodiments 1 and 2 may include a coil portion 36 wound in a vertical direction, and Embodiment 3 and Variation 2 of Embodiment 3 may include a coil portion 36 wound horizontally. However, the coil portion 36 may be wound in any way. FIGS. 13a to 13c illustrate the electronic component having the coil portion 36 wound in a vertical direction in another way. FIG. 13a is a top sectional view of the insulator portion 10, FIG. 13b is a side sectional view of the same, and FIG. 13c is an end sectional view of the same. As shown in FIGS. 13a to 13c, the coil portion 36 may have the central axis (a coil axis) in the Y-axis direction (the length direction) and have a rectangular opening.

Embodiment 4

Figure 14:
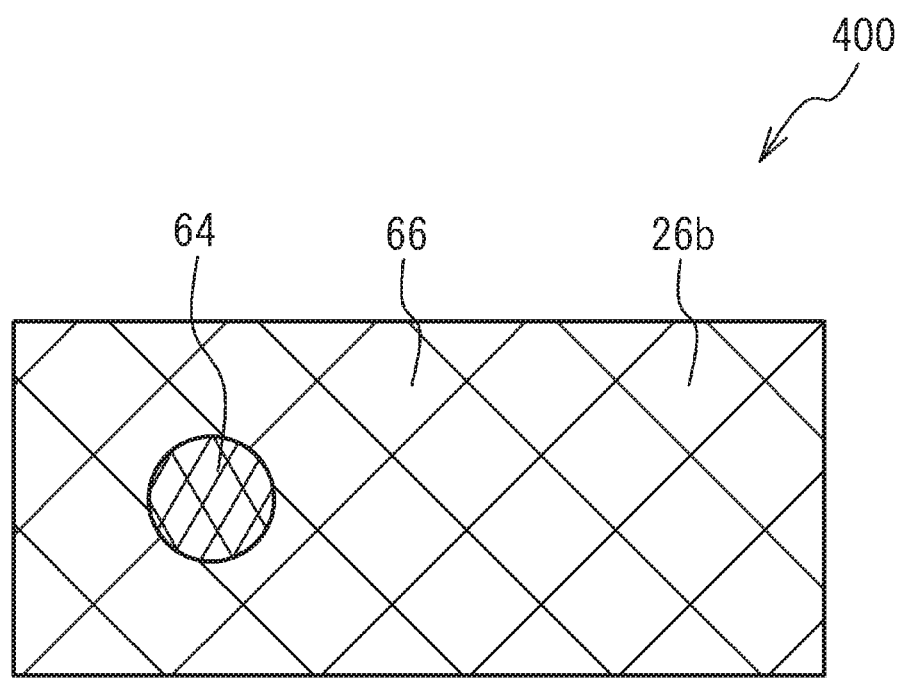
FIG. 14 is a top view of the electronic component according to Embodiment 4.

FIG. 14 is a top view of the electronic component 400 according to Embodiment 4. As shown in FIG. 14, in the electronic component 400 of Embodiment 4, the non-conductor layer 26b may include regions 64, 66 having different transmissivities of visible light. In the top view of the non-conductor layer 26b, the region 64 may have a circular shape and the other portion may constitute the region 66. The region 64 and the region 66 may be formed of different materials having different transmissivities of visible light for the same thickness. Other features of the electronic component 400 may be the same as for Embodiment 1 and will not be described herein.

In Embodiment 4, when visible light enters the non-conductor layer 26b (for example, visible light enters the non-conductor layer 26b perpendicularly thereto), the regions 64, 66 may have different transmissivities of the visible light. Therefore, when visible light enters the top surface 12 of the insulator portion 10, the region 64 and the region 66 may exhibit different shades of color. Thus, it may be possible to identify the direction of the electronic component 400.

Figure 15:
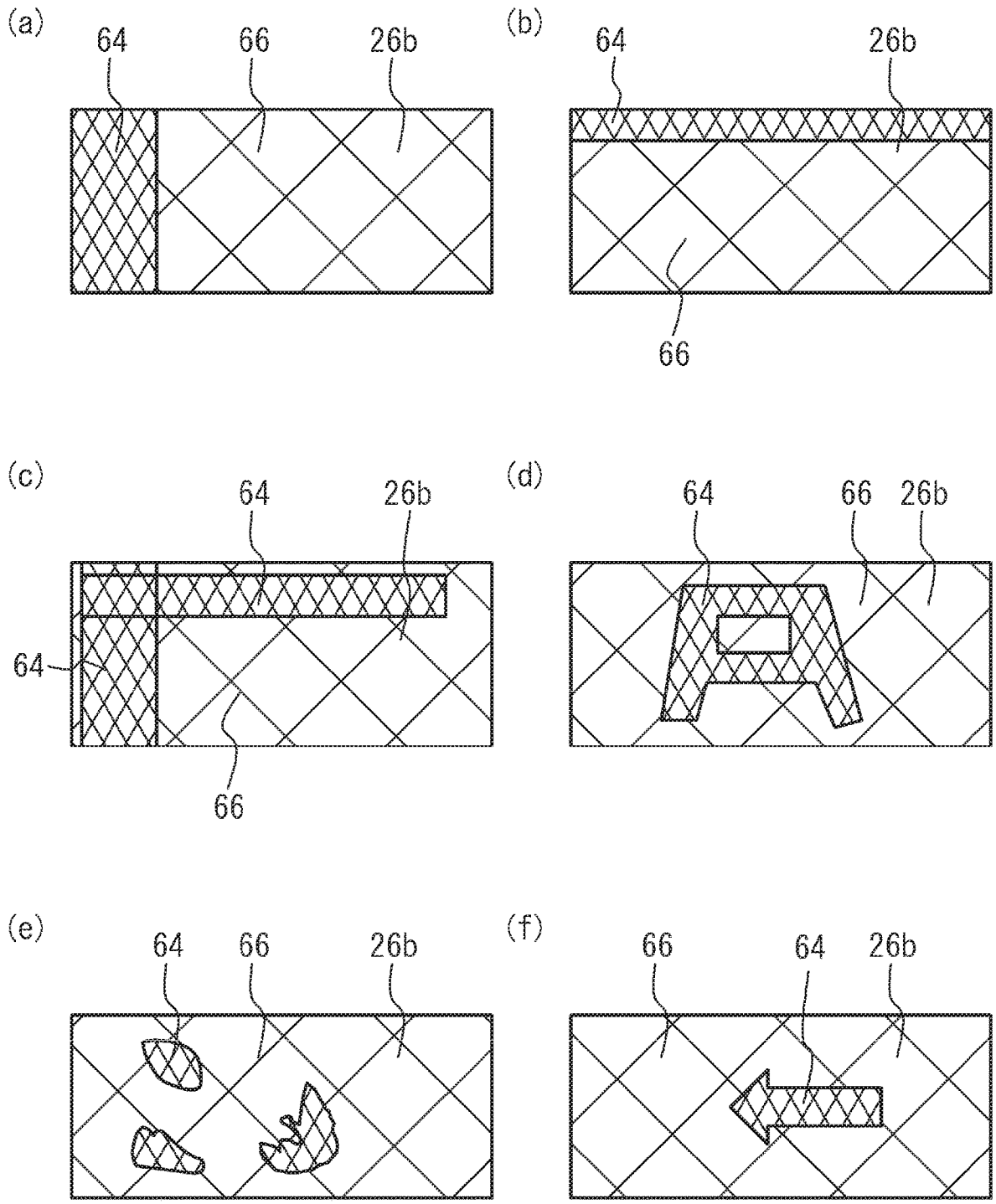
FIG. 15 includes parts (a) to (f) each showing a top view of the non-conductor layer.

The regions 64, 66 provided in the non-conductor layer 26b may not necessarily have the shape shown in FIG. 14 but may have other shapes. FIG. 15 includes parts (a) to (f) each showing a top view of the non-conductor layer 26b. The region 64 may extend in the width direction as shown in part (a) of FIG. 15, or extend in the length direction as shown in part (b) of FIG. 15, or extend in the width direction and the length direction so as to have an overlapping portion. The region 64 may have a character shape such as an alphabetic character shape as in part (d) of FIG. 15, or have a plurality of indeterminate shapes as in part (e) of FIG. 15, or have an arrow shape as in part (f) of FIG. 15. Thus, the regions 64, 66 provided in the non-conductor layer 26b may have any shape that identifies the direction of the component.

In Embodiment 4, it may also be possible that, in addition to the non-conductor layer 26b, the non-conductor layer 26a includes the regions 64, 66 having different shapes than in the non-conductor layer 26, and it may also be possible that the non-conductor layer 26b does not include the regions 64, 66 and only the non-conductor layer 26a includes the regions 64, 66.

Figure 16:
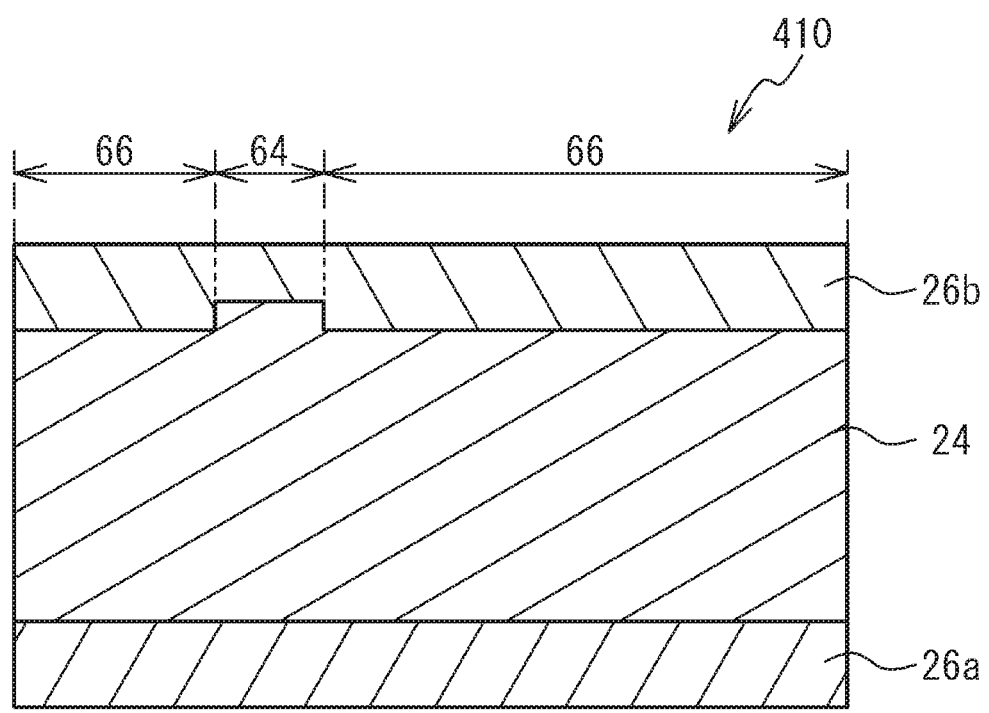
FIG. 16 is a sectional view of the electronic component according to Variation 1 of Embodiment 4.

FIG. 16 is a sectional view of the electronic component 410 according to Variation 1 of Embodiment 4. As shown in FIG. 16, in the electronic component 410 of Variation 1 of Embodiment 4, the entirety of the non-conductor layer 26b may be formed of materials having the same transmissivity of visible light for the same thickness, and the region 64 and the region 66 of the non-conductor layer 26b may have different thicknesses and thus have different transmissivities. Other features of the electronic component 410 may be the same as for Embodiment 4 and will not be described herein.

As in Variation 1 of Embodiment 4, the region 64 and the region 66 having different transmissivities of visible light may include portions having the same transmissivity of visible light for the same thickness and having different heights. Further, these portions may have different densities, in place of or in addition to the different thicknesses.

Embodiment 5

Figure 17:
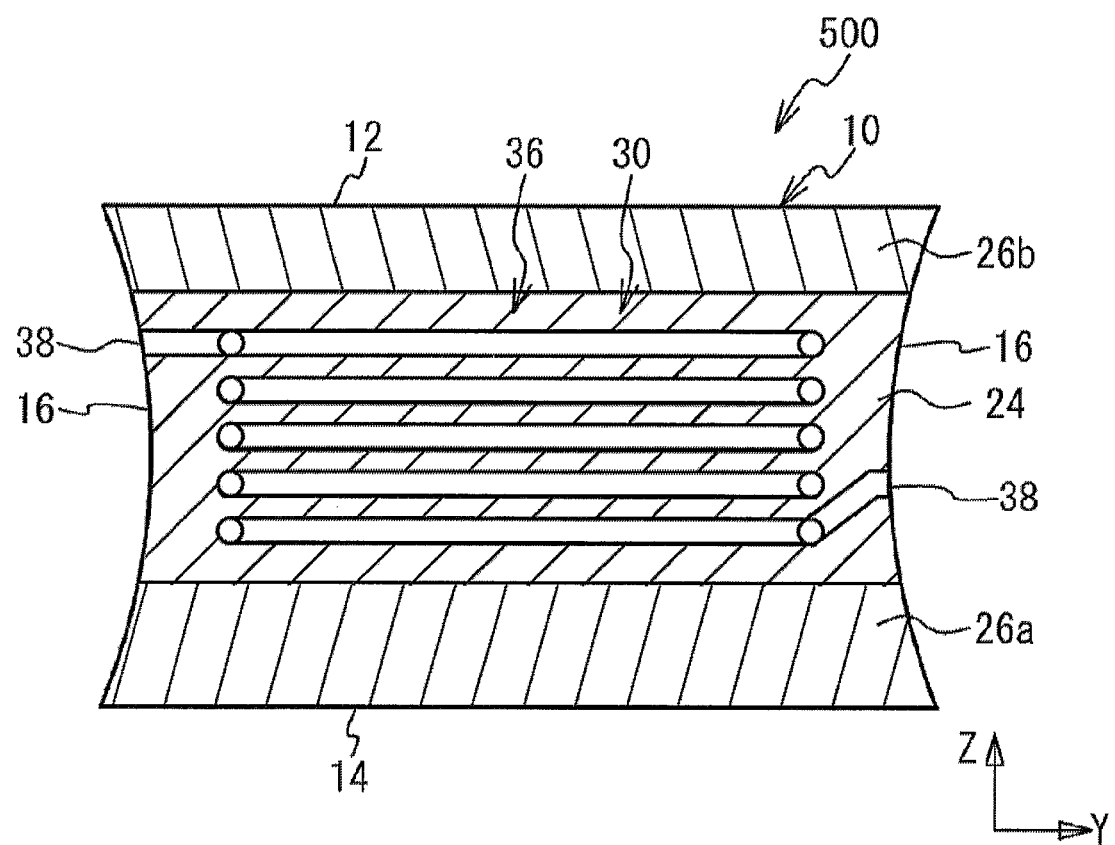
FIG. 17 is a side sectional view of the electronic component according to Embodiment 5.

FIG. 17 is a side sectional view of the electronic component 500 according to Embodiment 5. In FIG. 17, the external electrodes 50 are omitted. As shown in FIG. 17, in the electronic component 500 of Embodiment 5, the coil portion 36 may be wound horizontally, as in Embodiment 3. The end surface 16 of the insulator portion 10 may be curved concavely, and the length of the conductor-containing layer 24 in the Y-axis direction (the length direction) may be smaller than those of the non-conductor layers 26a, 26b. Other features of the electronic component 500 may be the same as for Embodiment 1 and will not be described herein.

According to Embodiment 5, the direction of the electronic component 500 can be identified, and since the lengths of the non-conductor layers 26a, 26b in the Y-axis direction (the length direction) are larger than that of the conductor-containing layer 24, the effect of the external electrodes 50 imparted to the coil portion 36 can be reduced. In addition, the outer size including the external electrodes 50 can be reduced.

Embodiment 6

Figure 18:
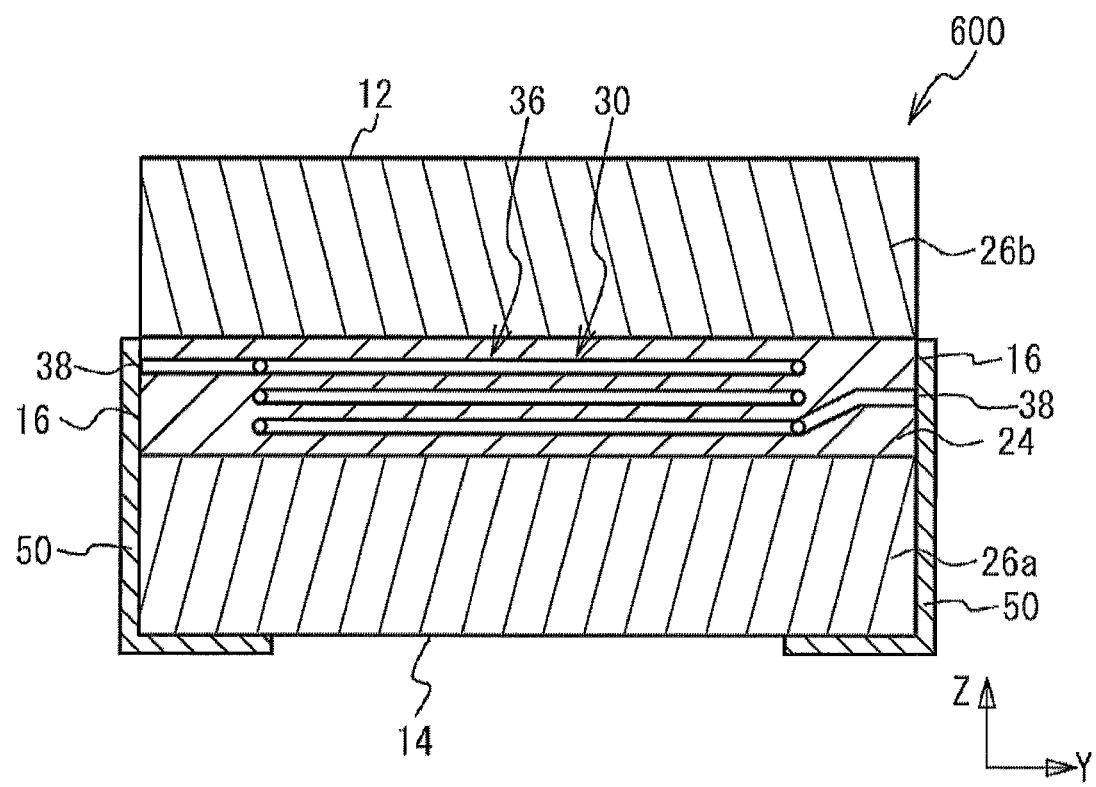
FIG. 18 is a side sectional view of the electronic component according to Embodiment 6.

FIG. 18 is a side sectional view of the electronic component 600 according to Embodiment 6. As shown in FIG. 18, in the electronic component 600 of Embodiment 6, the coil portion 36 may be wound horizontally, as in Embodiment 3. The non-conductor layers 26a, 26b may have lengths in the Z-axis direction (the thickness) larger than that of the conductor-containing layer 24. Other features of the electronic component 600 may be the same as for Embodiment 1 and will not be described herein.

According to Embodiment 6, the direction of the electronic component 600 can be identified, and since the thicknesses of the non-conductor layers 26a, 26b are larger than that of the conductor-containing layer 24, after the electronic component 600 is mounted on a mounting portion, the effect of the mounting portion imparted to the coil portion 36 can be reduced. In addition, the effect of the external electrodes 50 imparted to the coil portion 36 can also be reduced.

Embodiment 7

Figure 19:
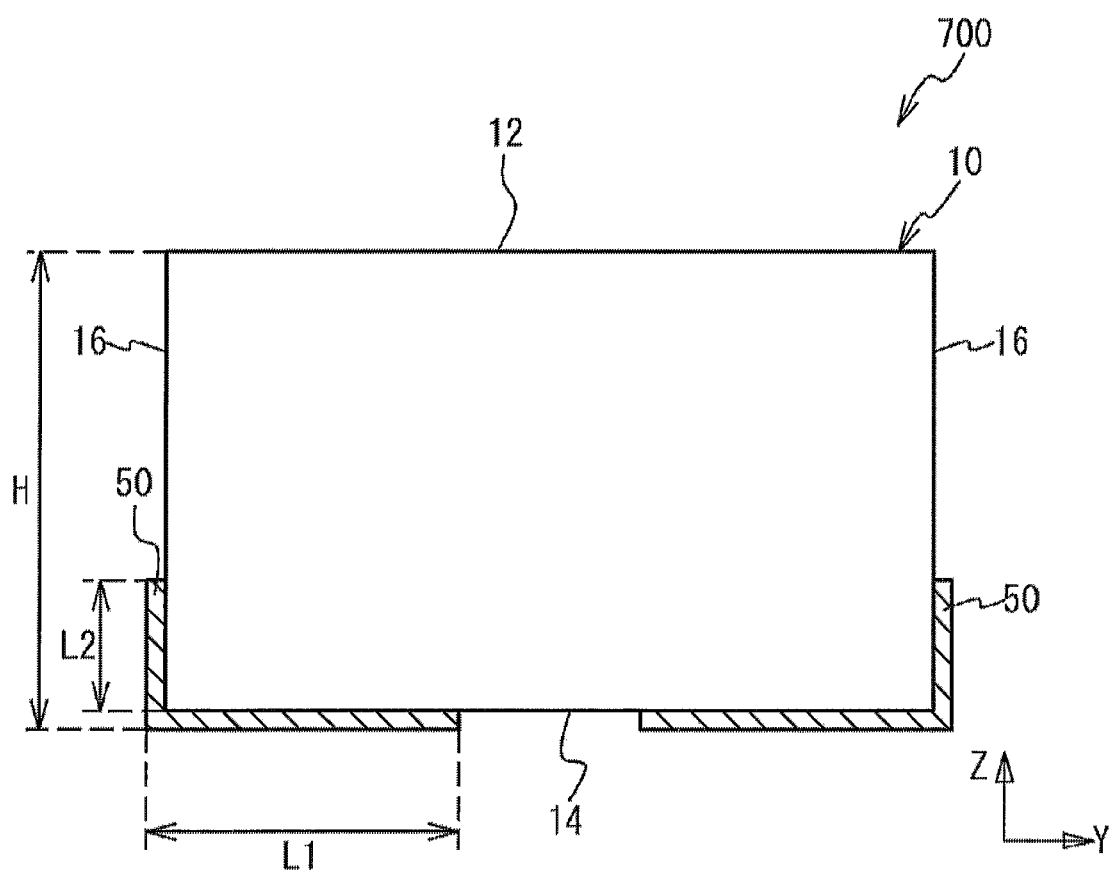
FIG. 19 is a side view of the electronic component according to Embodiment 7.

FIG. 19 is a side view of the electronic component 700 according to Embodiment 7. As shown in FIG. 19, in the electronic component 700 of Embodiment 7, the external electrodes 50 may have a length L1 in the Y-axis direction (the length direction) on the bottom surface 14 of the insulator portion 10 and a length L2 in the Z-axis direction (the height direction) on the end surfaces 16 of the insulator portion 10, and the length L1 is larger than the length L2. In addition, the length L2 may be equal to or less than half the height H of the electronic component 700. Other features of the electronic component 700 may be the same as for Embodiment 1 and will not be described herein.

According to Embodiment 7, the direction of the electronic component 700 can be identified, and since the external electrodes 50 extend for a long distance on the bottom surface 14 serving as the mounting surface, mounting of the electronic component 700 can be facilitated.

Embodiment 8

Figure 20:
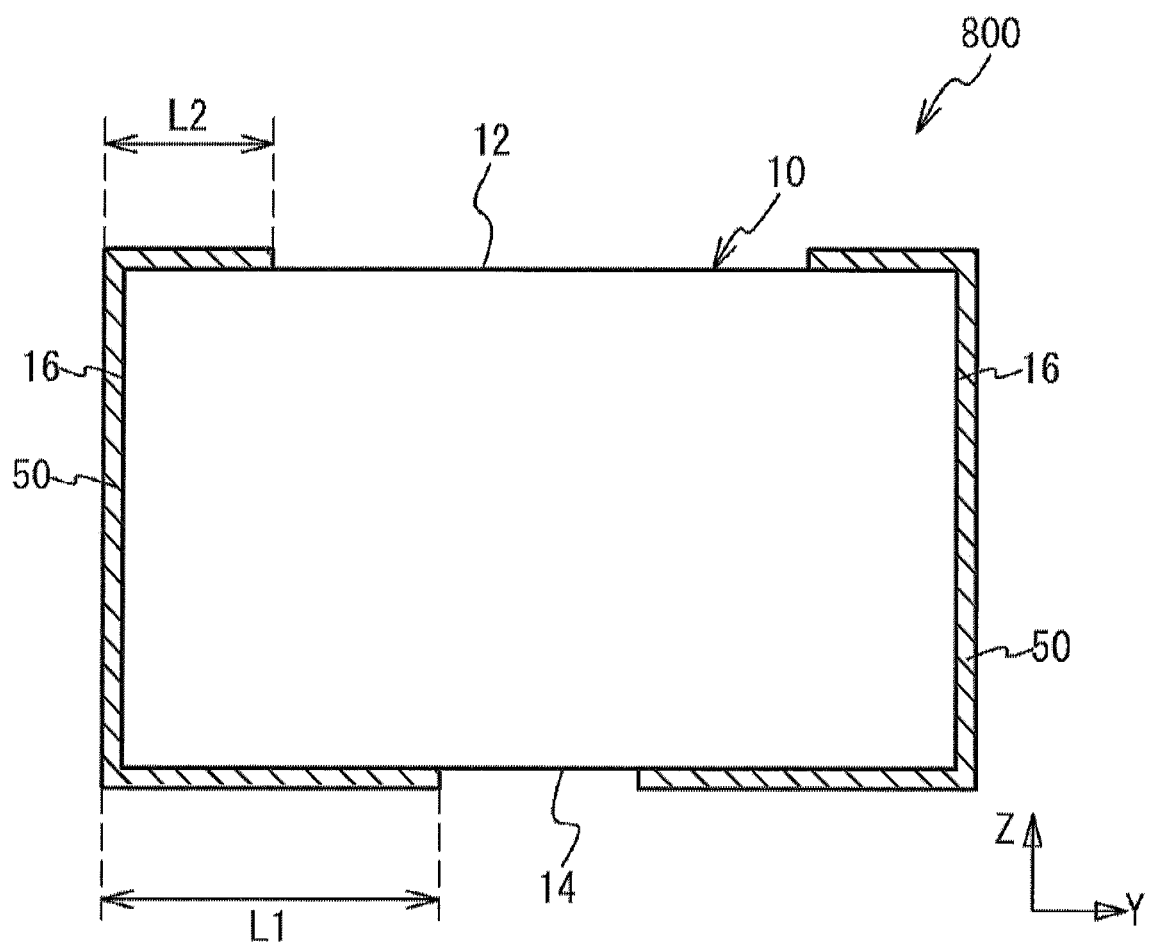
FIG. 20 is a side view of the electronic component according to Embodiment 8.

FIG. 20 is a side view of the electronic component 800 according to Embodiment 8. As shown in FIG. 20, in the electronic component 800 of Embodiment 8, the external electrodes 50 may extend from the bottom surface 14 via the end surfaces 16 to the top surface 12 of the insulator portion 10. The external electrodes 50 may have a length L1 in the Y-axis direction (the length direction) on the bottom surface 14 of the insulator portion 10 and a length L2 in the Y-axis direction (the length direction) on the top surface 12 of the insulator portion 10, and the length L1 is larger than the length L2. Other features of the electronic component 800 may be the same as for Embodiment 1 and will not be described herein.

According to Embodiment 8, the direction of the electronic component 800 can be identified, and since the external electrodes 50 extend for a long distance on the bottom surface 14 serving as the mounting surface, mounting of the electronic component 800 can be facilitated.

Embodiment 9

Figure 21A:
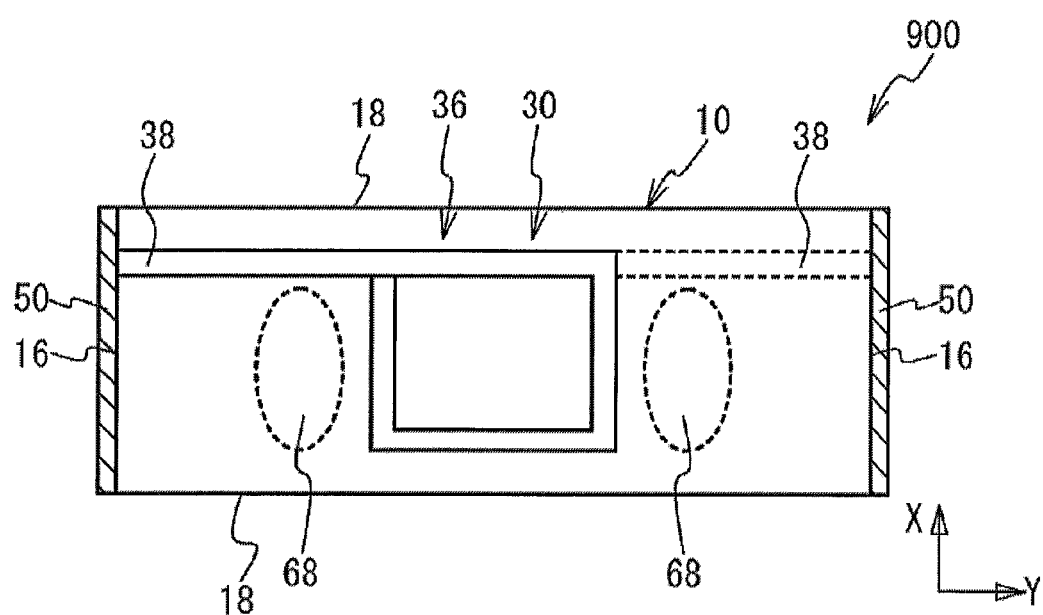
FIG. 21a is a top sectional view of the electronic component according to Embodiment 9.
Figure 21B:
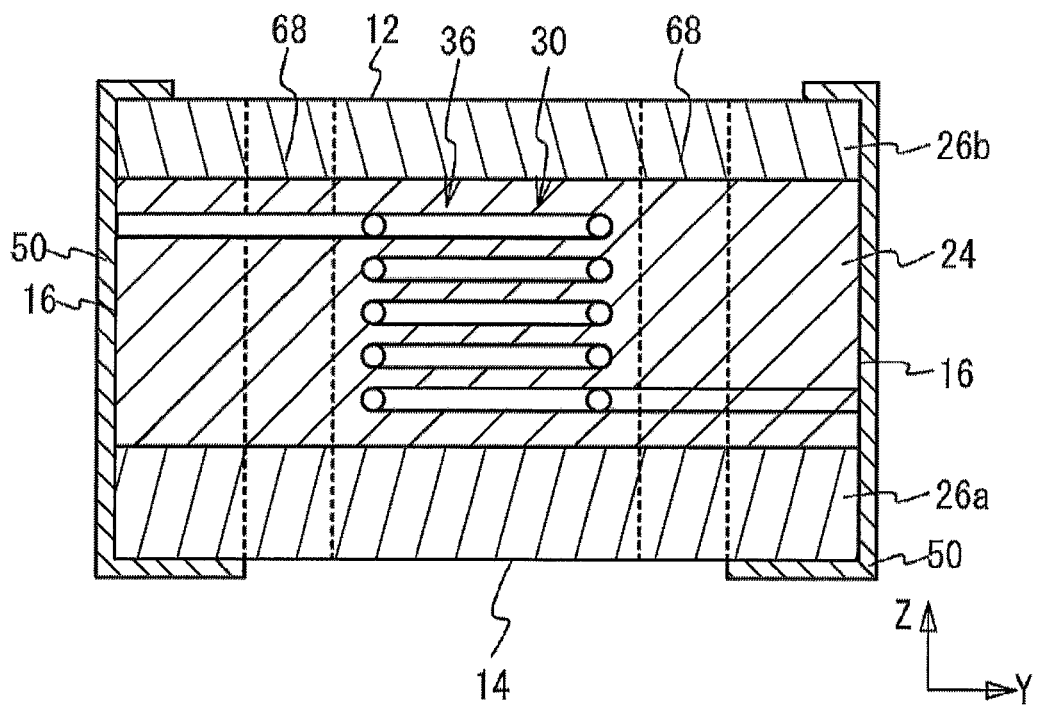
FIG. 21b is a side sectional view of the electronic component according to Embodiment 9.

FIG. 21a is a top sectional view of the electronic component 900 according to Embodiment 9, and FIG. 21b is a side sectional view of the same. As shown in FIGS. 21a and 21b, in the electronic component 900 of Embodiment 9, the coil portion 36 may be wound horizontally, as in Embodiment 3. Between the coil portion 36 of the internal conductor portion 30 and the external electrodes 50, there may be provided regions 68 that transmit light beams (such as visible light beam or infrared light beams) from the bottom surface 14 to the top surface 12 of the insulator portion 10. In the regions 68, the light beams may not be blocked by the internal conductor portion 30 or the external electrodes 50, and thus the light beams can pass through the regions 68. The external electrodes 50 may extend from the bottom surface 14 via the end surfaces 16 to the top surface 12 of the insulator portion 10. Other features of the electronic component 900 may be the same as for Embodiment 1 and will not be described herein.

According to Embodiment 9, the direction of the electronic component 900 can be identified by recognizing the regions 68 that transmit light beams. In addition, since the regions 68 that transmit light beams may be provided between the coil portion 36 and the external electrodes 50, the effect of the external electrodes 50 imparted to the coil portion 36 can be reduced.

In Embodiments 1 to 3, Variation 2 of Embodiment 3, and Embodiments 4 to 9, the electronic components may be coil elements. In Variations 1 and 3 of Embodiment 3, the electronic components may be capacitor elements. However, these examples are not limitative. The electronic components may be other than coil elements and capacitor elements (e.g., a resistance element).

Figure 22:
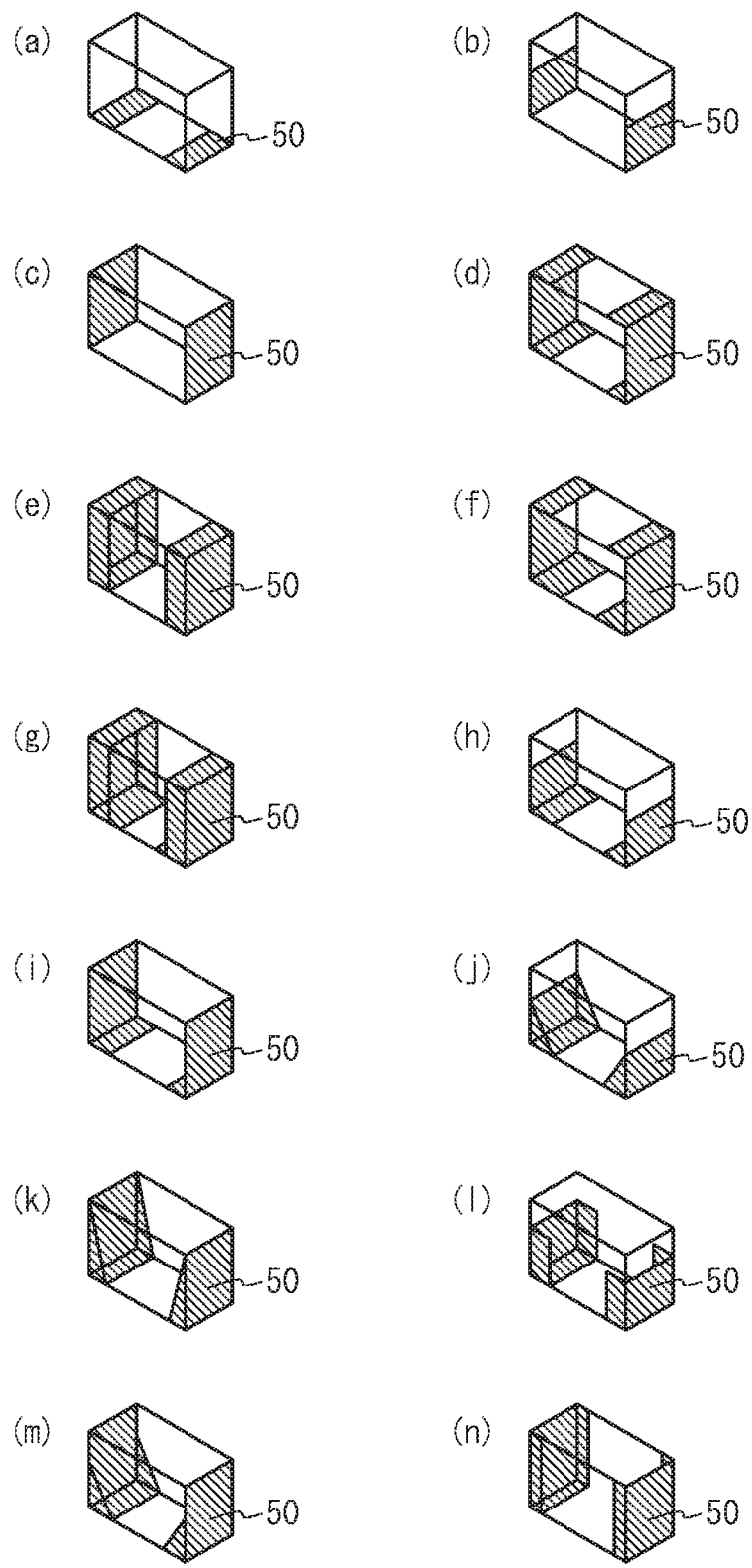
FIG. 22 includes parts (a) to (n) each showing a perspective view of an example of the shapes of external electrodes.

In Embodiments 1 to 9, the external electrodes 50 may have various shapes. FIG. 22 includes parts (a) to (n) each showing a perspective view of an example of the shapes of external electrodes 50. The external electrodes 50 may be provided on the bottom surface as in part (a) of FIG. 22, may be provided on the lower portions of the end surfaces as in part (b) of FIG. 22, or may be provided on the entire end surfaces as in part (c) of FIG. 22. The external electrodes 50 may extend from the bottom surface via the end surfaces to the top surface as in part (d) of FIG. 22, may further extend to the side surfaces as in part (e) of FIG. 22, or may extend on the top surface for a smaller distance than on the bottom surface as in part (g) of FIG. 22. The external electrodes 50 may extend from the bottom surface to a part of the end surfaces as in part (h) of FIG. 22, or may extend from the bottom surface to the entire end surfaces as in part (i) of FIG. 22. The external electrodes 50 may be provided in a triangular prism shape at opposite ends of the bottom surface as in parts (j) and (k) of FIG. 22, may be provided to cover a part of the bottom surface, a part of the side surfaces, and a part of the end surfaces as in part (l) of FIG. 22, or may be provided to cover a part of the bottom surface, a part of the side surfaces, and the entirety of the end surfaces as in parts (m) and (n) of FIG. 22.

The present invention is not limited to the specific embodiments described above and is susceptible of various deformation and modification within the scope of the purport of the present invention recited in the claims.

What is claimed is:
1. An electronic component comprising:
   an insulator portion having a plurality of surfaces, the insulator portion including a first region composed of a non-conductor layer and a second region composed of a conductor-containing layer having different transmissivities of a light beam entering one of the plurality of surfaces;
   an internal conductor portion provided in the conductor-containing layer of the insulator portion; and
   a plurality of external electrodes provided on the insulator portion and electrically connected to the internal conductor portion,
   wherein the non-conductor layer comprises no conductors.
2. The electronic component of claim 1, wherein
   the first region and the second region contain different materials having different transmissivities of the light beam for a same thickness.
3. The electronic component of claim 1, wherein
   the first region and the second region include portions having a same transmissivity of the light beam for a same thickness and having different thicknesses.
4. The electronic component of claim 1, wherein the second region has a higher transmissivity of the light beam than the first region, and the second region is transparent to visible light and extends from the one of the plurality of surfaces of the insulator portion to the internal conductor portion.
5. The electronic component of claim 1, wherein
   the second region includes a functional region including a functional portion of the internal conductor portion, and the first region does not include the functional region and includes a surrounding region positioned around the functional region, and the functional region is offset from a middle of the insulator portion in a direction parallel with the one of the plurality of surfaces.

6. The electronic component of claim 1, wherein the insulator portion includes a third region composed of another non-conductive layer, and the difference in transmissivity of the light beam between the first region and the third region is equal to or greater than 10%.

7. The electronic component of claim 1, wherein the insulator portion includes a third region composed of another non-conductive layer, and the first region and the third region are composed mainly of glass or resin, and the first region and the third region contain different amounts of metal oxide, organic coloring matter, silicon oxide, graphite, or carbonized silicon.

8. The electronic component of claim 1, wherein the insulator portion includes a third region composed of another non-conductive layer,
the first region and the third region are composed mainly of glass or resin and contain different amounts of metal oxide, and
the metal oxide includes at least one of aluminum oxide, cobalt oxide, manganese oxide, titanium oxide, potassium oxide, magnesium oxide, copper oxide, iron oxide, and zinc oxide.

9. The electronic component of claim 1, wherein the insulator portion includes an another non-conductor layer, the non-conductor layer of the first region being provided on the conductor-containing layer in a position closer to a bottom surface serving as a mounting surface, the another non-conductor layer being provided on the conductor-containing layer in a position closer to a top surface opposed to the bottom surface, and
wherein the non-conductor layer and the another non-conductor layer have different transmissivities of the light beam entering a surface crossing the bottom surface and the top surface.

10. The electronic component of claim 1, wherein the non-conductor layer is provided on the conductor-containing layer in a position closer to a bottom surface serving as a mounting surface or in a position closer to a top surface opposed to the bottom surface, and
wherein the conductor-containing layer and the non-conductor layer have different transmissivities of the light beam entering a surface crossing the bottom surface and the top surface.

11. The electronic component of claim 1, wherein the non-conductor layer is provided on the conductor-containing layer in at least one of a position closer to a bottom surface serving as a mounting surface and a position closer to a top surface opposed to the bottom surface,
the conductor-containing layer has a higher transmissivity of the light beam than the non-conductor layer, the light beam entering a surface crossing the bottom surface and the top surface, and
the conductor-containing layer is transparent to visible light.

12. The electronic component of claim 1, wherein another non-conductor layer is provided on the conductor-containing layer in a position closer to a bottom surface serving as a mounting surface, the non-conductor layer of the first region being provided on the conductor-containing layer in a position closer to a top surface opposed to the bottom surface,
the conductor-containing layer and the another of non-conductor layer have different transmissivities of the light beam entering a surface crossing the bottom surface and the top surface, and
the conductor-containing layer is offset from a middle of the insulator portion toward the top surface or the bottom surface.

13. The electronic component of claim 9, wherein the non-conductor layer and the another non-conductor layer have a larger specific gravity than the conductor-containing layer.

14. The electronic component of claim 9, wherein in a direction of long sides of the bottom surface of the insulator portion, the non-conductor layer and the another non-conductor layer have a larger length than the conductor-containing layer.

15. The electronic component of claim 9, wherein the non-conductor layer and the another non-conductor layer have a larger length in the top-bottom direction than the conductor-containing layer.

16. The electronic component of claim 1, wherein the insulator portion has a bottom surface serving as a mounting surface and a top surface opposed to the bottom surface, and a length of the bottom surface in a direction of short sides of the bottom surface is larger than a distance between the bottom surface and the top surface, and
a functional portion of the internal conductor portion is positioned closer to the top surface of the insulator portion.

17. The electronic component of claim 16, wherein a connection portion between the internal conductor portion and the plurality of external electrodes are positioned closer to the top surface than is a portion of the functional portion closest to the bottom surface.

18. The electronic component of claim 9, wherein the plurality of external electrodes extend from the bottom surface of the insulator portion to end surfaces connected to short sides of the bottom surface of the insulator portion,
a length of the plurality of external electrodes on the bottom surface of the insulator portion in a direction of long sides of the bottom surface is larger than a length of the plurality of external electrodes on the end surfaces of the insulator portion in a top-bottom direction, and
a length of the plurality of external electrodes on the end surfaces of the insulator portion in the top-bottom direction is equal to or less than half a length of the electronic component in the top-bottom direction.

19. The electronic component of claim 9, wherein the plurality of external electrodes extend from the bottom surface of the insulator portion via end surfaces connected to short sides of the bottom surface of the insulator portion to the top surface of the insulator portion, and
in a direction of long sides of the bottom surface of the insulator portion, a length of the plurality of external electrodes on the top surface of the insulator portion is smaller than a length of the plurality of external electrodes on the bottom surface of the insulator portion.

20. The electronic component of claim 1, wherein the insulator portion includes a region that transmits the light beam between a functional portion of the internal conductor portion and the plurality of external electrodes.

21. The electronic component of claim 1, wherein the electronic component is a coil element.

22. The electronic component of claim 1, wherein the electronic component is a capacitor element.

23. The electronic component of claim 1, wherein the insulator portion includes a third region composed of another non-conductive layer, and the first region and the third region contain different materials having different transmissivities of the light beam for a same thickness.

24. The electronic component of claim 1, wherein the insulator portion includes a third region composed of another non-conductive layer, and the first region and the third region include portions having a same transmissivity of the light beam for a same thickness and having different thicknesses.

* * * * *